US010906511B2

United States Patent
Shih et al.

(10) Patent No.: US 10,906,511 B2
(45) Date of Patent: Feb. 2, 2021

(54) SYSTEMS AND METHODS FOR PREDICTING DEMANDS FOR EXCHANGEABLE ENERGY STORAGE DEVICES

(71) Applicant: Gogoro Inc., Hong Kong (CN)

(72) Inventors: I-Fen Shih, New Taipei (TW); Yun-Chun Lai, Hsinchu (TW); Sheng-Chin Chuang, New Taipei (TW); Daniel Vickery, Ipswich, MA (US); Hok-Sum Horace Luke, Mercer Island, WA (US); Bo-Yu Chu, Taipei (TW)

(73) Assignee: Gogoro Inc., Hong Kong (CN)

( * ) Notice: Subject to any disclaimer, the term of this patent is extended or adjusted under 35 U.S.C. 154(b) by 34 days.

(21) Appl. No.: 16/235,980

(22) Filed: Dec. 28, 2018

(65) Prior Publication Data
US 2019/0202414 A1     Jul. 4, 2019

Related U.S. Application Data

(60) Provisional application No. 62/612,141, filed on Dec. 29, 2017.

(51) Int. Cl.
*B60S 5/06*     (2019.01)
*B60L 53/80*     (2019.01)
(Continued)

(52) U.S. Cl.
CPC .............. *B60S 5/06* (2013.01); *B60L 53/305* (2019.02); *B60L 53/66* (2019.02); *B60L 53/665* (2019.02);
(Continued)

(58) Field of Classification Search
CPC .......... B60S 5/06; B60L 53/67; B60L 53/665; H02J 7/00036; H02J 7/0022
(Continued)

(56) References Cited

U.S. PATENT DOCUMENTS 9,235,847 B2 * 1/2016 Greene ................ G06Q 10/04
2013/0030581 A1   1/2013 Luke et al.
(Continued)

FOREIGN PATENT DOCUMENTS

| JP | 2014-527689 A | 10/2014 |
|---|---|---|
| JP | 2016-084633 A5 | 5/2016 |
| KR | 10-2014-0078623 A | 6/2014 |

OTHER PUBLICATIONS

European Search Report Received for European Patent Application No. EP18248293.5; Applicant: Gogoro Inc., dated Jun. 14, 2019, 5 pages.
(Continued)

*Primary Examiner* — Richard V Muralidar
(74) *Attorney, Agent, or Firm* — Perkins Coie LLP

(57) ABSTRACT

The present disclosure relates to methods and associated systems for managing a plurality of device-exchange stations. The method includes, for example, (1) receiving empirical information regarding exchanges of energy storage devices from each of the plurality of device-exchange stations in an initial time period; (2) determining a target time period; (3) identifying a plurality of reference factors and associated weighting values based on empirical information regarding exchanges of energy storage devices; (4) determining demand information during the target time period for each of the plurality of device-exchange stations during the target time period for each of the device-exchange stations; and (5) forming a plurality of charging plans for
(Continued)

each of the plurality of device-exchange stations according to demand information during the target time period.

20 Claims, 8 Drawing Sheets

(51) Int. Cl.
*B60L 53/68* (2019.01)
*B60L 53/30* (2019.01)
*H02J 7/00* (2006.01)
*G06Q 10/06* (2012.01)
*G06Q 30/06* (2012.01)
*B60L 53/67* (2019.01)
*B60L 53/66* (2019.01)
*B60L 58/12* (2019.01)

(52) U.S. Cl.
CPC .............. *B60L 53/67* (2019.02); *B60L 53/68* (2019.02); *B60L 53/80* (2019.02); *B60L 58/12* (2019.02); *G06Q 10/06315* (2013.01); *G06Q 30/06* (2013.01); *B60L 2200/12* (2013.01); *B60L 2260/50* (2013.01); *B60L 2260/54* (2013.01); *H02J 7/0022* (2013.01); *H02J 7/00036* (2020.01)

(58) Field of Classification Search
USPC ........................................ 320/104, 106, 109
See application file for complete search history.

(56) References Cited

U.S. PATENT DOCUMENTS

| 2015/0039391 | A1* | 2/2015 | Hershkovitz | ...... G06Q 30/0202 705/7.31 |
| 2019/0202415 | A1* | 7/2019 | Lai | ............................ B60S 5/06 |
| 2019/0202416 | A1* | 7/2019 | Lai | ........................... B60L 53/68 |
| 2019/0207267 | A1* | 7/2019 | Vickery | ............... H01M 10/425 |
| 2019/0207268 | A1* | 7/2019 | Lai | ......................... H02J 7/0069 |
| 2019/0207397 | A1* | 7/2019 | Lai | ....................... H01M 10/482 |
| 2019/0207398 | A1* | 7/2019 | Shih | ......................... B60L 53/68 |

OTHER PUBLICATIONS

Notice of Publication Received for co-pending Philippines Patent Application No. PH1-2019-000003; Applicant: Gogoro Inc., dated Aug. 22, 2019, 3 pages.
Office Action Received for Korean Application No. KR10-2018-0172821; Applicant: Gogoro Inc., dated Jun. 30, 2020, 9 pages.
Office Action Received for Indian Application No. IN201814049179; Applicant: Gogoro Inc., dated Jun. 25, 2020, 6 pages.

* cited by examiner

SYSTEMS AND METHODS FOR PREDICTING DEMANDS FOR EXCHANGEABLE ENERGY STORAGE DEVICES

CROSS-REFERENCE TO RELATED APPLICATION

The present application claims the benefit of and priority to U.S. Provisional Application No. 62/612,141, filed Dec. 29, 2017, which is incorporated herein by reference in its entirety.

TECHNICAL FIELD

The present technology is directed to systems and methods for managing multiple device-exchange stations for exchangeable energy storage devices. More particularly, the present technology is directed to systems and methods for managing multiple device-exchange stations by providing charging plans thereto based on a predicted demand for exchangeable energy storage devices.

BACKGROUND

Some electric vehicles are powered by exchangeable batteries. For such electric vehicles, having sufficiently-charged batteries available to users when they want to make a battery exchange is an important factor in providing a satisfying user experience. However, it can require a significant amount of energy to charge batteries and maintain the state of charge of these batteries. Unnecessary charging or maintaining can negatively affect a system's cost-efficiency and energy-efficiency. In addition, the numbers of users and exchangeable batteries frequently change (e.g., a new user subscribes to a battery service plan; a new exchange station is established), and therefore it is very difficult to predict a battery demand in the future based on historical data (the "trend" issue). Also, there can be a significant amount of "noise" in this data (e.g., information that can be misleading when predicting a future battery demand; the "noise" issue). Therefore, it is advantageous to have an improved system and method to address these issues.

BRIEF DESCRIPTION OF THE DRAWINGS

Embodiments of the disclosed technology will be described and explained through the use of the accompanying drawings.

Figure 1:
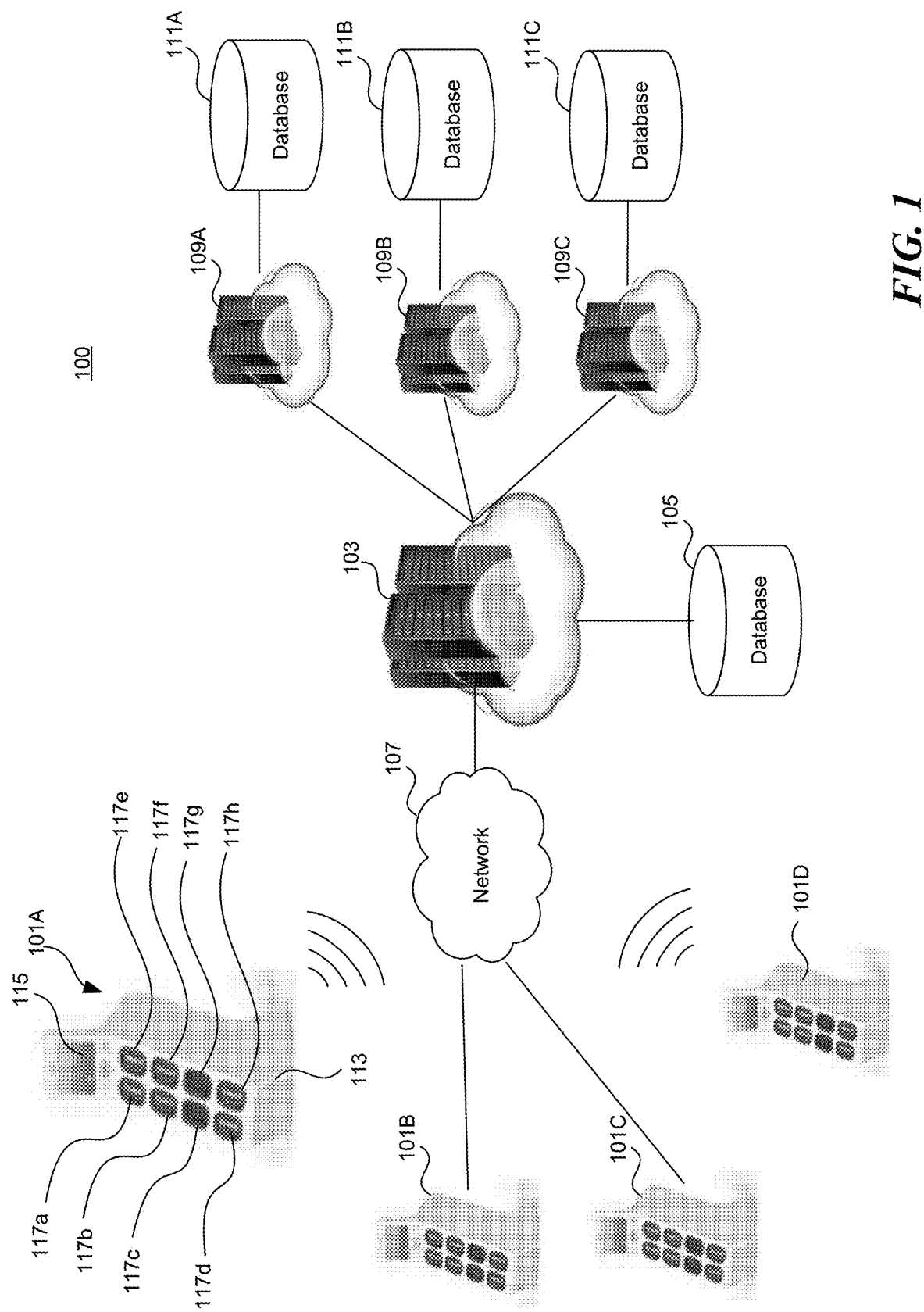
FIG. 1 is a schematic diagram illustrating a system in accordance with embodiments of the disclosed technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiments," "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure is directed to methods and systems for managing a plurality of device-exchange stations. The device-exchange stations are configured to enable users to exchange energy storage devices (e.g., batteries). The disclosed methods can be implemented by a server connected with the device-exchange stations via a network. In some embodiments, based on empirical data (e.g., historical information regarding battery exchanges in the past, such as the number of batteries actually exchanged at some stations (and a mismatch between a predicted demand and the actual exchanged number) during a particular time, unsatisfied battery exchange demands, etc.), the disclosed system can determine a plurality of reference factors (e.g., a factor matrix) and associated weighting values (e.g., a weighting matrix). The system can then predict battery exchange demands in the future (e.g., see Equation A below). By adjusting the weighting values and analyzing the same with historical data, the system can effectively identify reference factors that are relatively important. Accordingly, the weighting values can be updated and then used to predict future battery demand. In some embodiments, based on the empirical data, the system can identify various types of device-exchange stations, each type of stations has the same battery exchange feature (e.g., "curves" described in connection with FIGS. 5A and 5B). In some embodiments, these "types" of stations alone can be used to predict future battery demands. In other embodiments, the "types" of stations can also be considered as a "reference factor" to calculate future battery exchange demand (e.g., see Equation A below).

In some embodiments, the methods include, for example, (1) receiving empirical information (e.g., from a memory in a server or a database connected to the server) regarding exchanges of energy storage devices from each of the plurality of device-exchange stations in an initial time period; (2) determining a target time period; (3) identifying a plurality of reference factors corresponding to each of the plurality device-exchange stations in the target time period (e.g., the reference factors comprise multiple characteristics associated with the plurality of device-exchange stations and combinations of the characteristics); (4) determining expected demand information for the target time period for each of the plurality of device-exchange stations (e.g., the target time period is later than the initial time period; e.g., the initial time period can be 9 p.m. today and the target time period can be 3 p.m. to 4 p.m. tomorrow; in some embodiments, the initial time period can include a time period during which the empirical information is collected/generated); and (5) forming a plurality of charging plans for each of the plurality of device-exchange stations according to the expected demand information during the target time period.

In some embodiments, the reference factors can include (1) a characteristic (e.g., station identification, time-related unit such as hour, day, month, holiday, weather, special event, etc.) associated with demand prediction; (2) a combination of two or more characteristics (e.g., "cross-term" factors discussed below); (3) a "type" of device-exchange station (e.g., a "heavy-traffic" type, an "intermediate-traffic" type, or a "light-traffic" type, discussed below); and (4) a combination of the above. Each of the reference factors has an associated weighting value, which is indicative of its relative importance when calculating a future battery demand. In some embodiments, for example, a system operator (e.g., of a server in the system) can select a few reference factors to consider for predicting a future battery demand. The system operator can then assign a weighting value to each of the selected reference factors. In some embodiments, however, the system operator can put all references factors in a factor matrix (e.g., "matrix x" as discussed below). The system operator can (1) assign higher weighting values (e.g., in a weighting value matrix) to the reference factors that significantly relate to demand prediction; and (2) assign lower (or even zero) weighting values to the reference factors that do not significantly relate to demand prediction. In some embodiments, the maximum number of reference factors selected can be set in the demand prediction process so as to (1) simplify computation of the demand predication process; and/or (2) prevent "over fitting" caused by too many factors while some of them may include noise. The system (or a system operator) can determine significance or relative importance of the reference factors and then select the reference factors. Also, the maximum number of reference factors can be determined based on complexity of the computation of the demand prediction process and available computing resources of the system.

In some embodiments, the empirical information regarding exchanges of energy storage devices can be historical data or information regarding how many energy storage devices are exchanged during particular time periods at a particular device-exchange station and also the difference between the predicted demand (e.g., a predicted exchange number of energy storage devices) and the actual number of battery exchanges during that particular time periods. For example, the information can be (1) 10 batteries were exchanged at Station A during 10 a.m. to 11 a.m. on Jan. 12, 2017, and only 8 batteries were predicted to be exchanged; (2) 35 batteries were exchanged at Area X (including Stations X1-Xn) during 11 a.m. to 12 a.m. on the first Thursday of November 2017 and 40 battery exchanges were predicted; (3) 17 batteries with over 90% state of charge (SoC) were exchanged at Station B during 7 p.m. to 8 p.m. on the 5th day of July 2017; (4) 55 batteries were exchanged at Station C during 5 p.m. to 6 p.m. on Feb. 5, 2017 and there is an event held nearby; (5) 28 batteries were exchanged at Station D during 9 p.m. to 10 p.m. on the 234th day of year 2017; or (6) 45 batteries were reserved but only 40 batteries were exchanged at Station E during 8 a.m. to 9 a.m. on Sep. 7, 2017, and a weather report shows the day was a sunny day after 10 consecutive raining days. The foregoing are only examples and there can be other types of information in various embodiments.

Once the disclosed system receives the historical information regarding a demand of energy storage devices, the system then analyzes the information and establishes a model for predicting a demand for energy storage device in the future. In some embodiments, the model is established based on regression/logical analyses (e.g., online Poisson regression, online least square regression, decision-tree analysis, etc.) and machine learning analyses (e.g., to "train" the model by feeding data, analyzing the outputs, and adjusting the model) until the model produces an output that is with some defined error amount. For example, the model can be shown as the following equation:

$$p = w^T x \qquad \text{Equation (A)}$$

"P" refers to a prediction of a demand for energy storage devices at specific device-exchange station during a particular time period (e.g., the system predicts there will be 25 exchanges of energy storage devices at Station A from 8 a.m. to 9 a.m. tomorrow). The term "x" refers to reference factors to be considered (e.g., a matrix having multiple elements; each element represents a reference factor). The term "w" refers to weighting values (e.g., a matrix having multiple elements; each element represents a weighting value for a corresponding reference factor) for the reference factors "x."

The reference factors "x" can include a plurality of characteristics, for example, station identification, time (which can be divided as various time periods, each time period can be considered as a reference factor), locations of the stations, environmental conditions (e.g., ambient temperature, humidity, etc.), events (e.g., traffic accidents, concerts, sports games, etc.) and other suitable reference factors. The present system also enables an operator to select a "crossing-term" factor, which means combining two or more characteristics as a reference factor. For example, a combination of the characteristics can be "Station A and Wednesday," "Station B, 7 a.m. to 9 a.m., and Weekend," etc. By combining two or more characteristics, the disclosed method can effectively identify relationships among reference factors and quickly consider these "crossing-term" factors when generating predicted demands (e.g., rather than giving each of the reference factors a weighting value, now the system can assign only one weighting value to one crossing-term factor, which enhance the calculation efficiency).

Also, in some embodiments, when a specific combination of characteristics can represent a set of features (e.g., curves in FIGS. 5A and 5B), the combination of characteristics can be considered a "type of station" reference factor, which can also be used to predict battery demands.

For example, factor X1 can be "station identification" (e.g., Station A), factor X2 can be "which day of a week" (e.g., Friday), and factor F3 can be "a time period of a day" (e.g., 1 a.m. to 3 a.m.) In this embodiment, the system allows the operator to add factor X4 (e.g., Station A, Friday, and 1 a.m. to 3 a.m.) by combining X1, X2, and X3. The operator can also add factor X5 (e.g., Station A and Friday) by combining X1 and X2. Similarly, the operator can add factor X6 (e.g., Station A and 1 a.m. to 3 a.m.) by combining X1 and X3. The operator can also add factor X7 (e.g., Friday, and 1 a.m. to 3 a.m.) by combining X2 and X3. Each of factors X1-X7 has a corresponding weighting vale (e.g., in the weighting matrix "w").

Once the factors associated with a target time period of a device-exchange station (e.g., 4 p.m. to 5 p.m. at station A)

are determined, then a prediction of demand for energy storage devices "P" can be derived from Equation A through multiplication of matrix w and matrix A. Weighting values corresponding to the reference factors can be determined, adjusted, and/or updated continuously based on empirical information and updated data. For example, the system can determine the weighting values for the factors by comparing both "supply" information (e.g., exchanges that actually happen) and "demand" information (e.g., a predicted demand), by achieving an object characterized by the following object function:

$$w = \arg\min_w \text{sum}(P-y)^2 \quad \text{Equation (B)}$$

The term "y" refers to the number of actual exchanges of energy storage devices. Based on Equation (B) above, the system can determine/adjust/update the weighting values "w," which can be used to predict future exchanges of energy storage device.

To effectively address the "trend" problem mentioned in the background section, the disclosed system can update the weighting value "w" by periodically (e.g., daily or updating upon a new event such as adding a new user or a new station), based on the following equations.

$$g = (p-y)x \quad \text{Equation (C)}$$

$$w_t = w_{t-1} - ag \quad \text{Equation (D)}$$

The term "g" refers to gradient, which can be calculated based on the difference between the actual exchange "y" and the predicted demand "p," and the difference can then be used to adjust the weighting values of the reference factors associated with target time period, according to the actual exchanges of energy storage devices. The term "a" refers to failure contributing rates (or refresh rates) (e.g., a matrix having multiple elements; each element represents a failure contributing rate for a corresponding factor in factor matrix "x").

The failure contributing rate "a" is indicative of the reliability of the factors. The failure contributing rate can be determined by the system operator or based on empirical studies (e.g., using a concept similar to the process of updating the weighting values "w"). When the system deems a factor more "reliable," it means that the "relevance" (or "frequency") of this factor being associated with the prediction calculations (i.e., the calculation of Equation A for every selected target time period) is high and the weighting value corresponding to this factor is updated frequently. As a result, the weighting value corresponding to this factor is (relatively) reliable. If there is a huge difference between the actual number of exchanges and the predicted demand prediction, the inaccuracy of the predicted demand is probably not caused by this factor and its weighting value. On the other hand, if a factor shows up "infrequently" (for example, a special event or holiday that happens once a year), a less trained/updated weighting value corresponding to this "infrequent" factor may contribute more to the inaccuracy. As a result, a "reliable" factor is assigned with a lower failure contributing rate, and accordingly that factor will be updated more frequently (each "update" changes a bit, and the result of the updates can be accumulated, which leads to a more accurate prediction). The failure contributing rate values corresponding to less reliable factors are high, and the weighting factors thereof are updated less frequently (and more drastically). For example, the system can determine that the factor "a day of a week" is reliable and therefore gives it a low failure contributing rate value and will update its weighting value frequently. By considering the failure contributing rates, the "reliable" factors may stay reliable without being affected by non-daily reasons or events, and the system can effectively address the "noise" issues mentioned above. In some embodiments, the weighting values "w" and failure contributing rate "a" can be obtained (e.g., determined, adjusted and updated) by machine learning processes (e.g., calculation associated with Equations B, C and/or D.

In some embodiments, the present system can set a threshold to limit the numbers of the factors "x" to be considered, so as to prevent or impede "overfitting." For example, some exchanges can result from an unpredictable event such as a random action of a user (a user usually exchanges devices in Area K, but one day the user exchanges a device in Area J). The system can consider the random action as "noise" and does not adjust the weighting values accordingly in a fine manner (e.g., does not update it frequently). In some embodiments, the system can set priorities of the factors based on their current weighting values of the factors. For example, in some embodiments, the system can select/determine the factors based on the set priorities.

In some embodiments, the system can use other regression model such as Poisson regression. In such embodiments, the model can be shown as the following equation:

$$P = e^z, z = w^T x \quad \text{Equation (E)}$$

Accordingly, the objective equation can be:

$$w = \arg\min_w \text{sum} - \ln(\exp((P-y)^2)) \quad \text{Equation (F)}$$

In other embodiments, the system can use other suitable approaches to establish its prediction model, such as using methods based on other regression schemes like online/batch linear regression, methods based on "decision trees," or other suitable methods.

In some embodiments, the system can update the weighting values "w" when there is new reference information coming in (e.g., a new user, a new station, a user moves from one area to another, a user stops using device-exchange service, an existing station is out of service, etc.). This updating approach can be named as an "online" approach. In other embodiments, the weighting values "w" can be updated periodically such as daily or updated when have a batch of new data entries.

Advantages of the present disclosure include, for example, (1) it effectively addresses the "trend" issue by frequently updating the weighting values "w" of the factors "x"; (2) it can also address the "noise" issue by considering failure contributing rate "a"; and (3) it can prevent or impede "overfitting" but limiting the number of factors to be considered. The foregoing discussion for predicting demands associated with Equations (A)-(F) (the "model") can be implemented by a server such as one shown in FIG. 1 (main server 103) or FIG. 2 (server system 200) described below.

The present disclosure also relates to a method and system for predicting demands of exchangeable energy storage devices (e.g., batteries) in a real-time (e.g., milliseconds to seconds) or near real-time (e.g., minutes to hours) manner. In one embodiment, the disclosed system analyzes historical battery demand data of each battery exchange station (i.e., the empirical information) and then predicts expected battery exchanges in every time interval (e.g., 1 hour) in every battery exchange station. More particularly, the present system collects information from multiple sources (e.g., battery exchange stations, electric vehicles, batteries, user mobile devices, etc.), analyzes the same, and generates reference information that can be used to predict demands of exchangeable energy storage devices for an exchange station during a particular time period. The collected information can include, for example, the locations of sampling stations (e.g., the sampling stations can be selected from all of the multiple battery exchange stations coupled to a server and managed by an operator), events nearby the sampling stations, environmental conditions close to the sampling stations, user profile information (e.g., a user name, vehicles owned by user, a user address, user battery plans, user preferences, etc.), and user behavior (e.g., battery usage, user driving/riding history, user behavior, user habits, etc.) associated with the sampling stations. After analyzing the collected reference information, the present system determines or identifies reference factors such as characteristics or power consumption patterns for various types of battery exchange stations. The determined or identified characteristics/patterns can then be used as guidance for controlling one or more battery exchange stations to charge the batteries therein.

In some embodiments, a battery exchange station is a stationary machine positioned at a particular location where users can access and exchange rechargeable batteries. The battery exchange station can include (1) a display as a user interface and (2) a battery rack having multiple battery slots configured to accommodate/charge rechargeable batteries. For example, the battery exchange station can include eight battery slots. During operation, there are only six battery slots occupied by batteries, and the remaining two slots are reserved for a user to insert a battery to be exchanged (e.g., low power or depleted batteries). In some embodiments, the battery exchange station can have different arrangements such as different numbers of racks, displays, and/or slots. In some embodiments, the battery exchange station can include modular components (e.g., modular racks, modular displays, etc.) that enable an operator to conveniently install or expand the capacity of the battery exchange station. The battery exchange station can be electrically coupled to one or more power sources (e.g., power grid, power lines, power storage, power station/substations, etc.) to receive power to charge the batteries positioned therein and to perform other operations (e.g., to communicate with a server). Embodiments of the battery exchange station are discussed in detail below with reference to FIGS. 1 and 3.

Figure 5A:
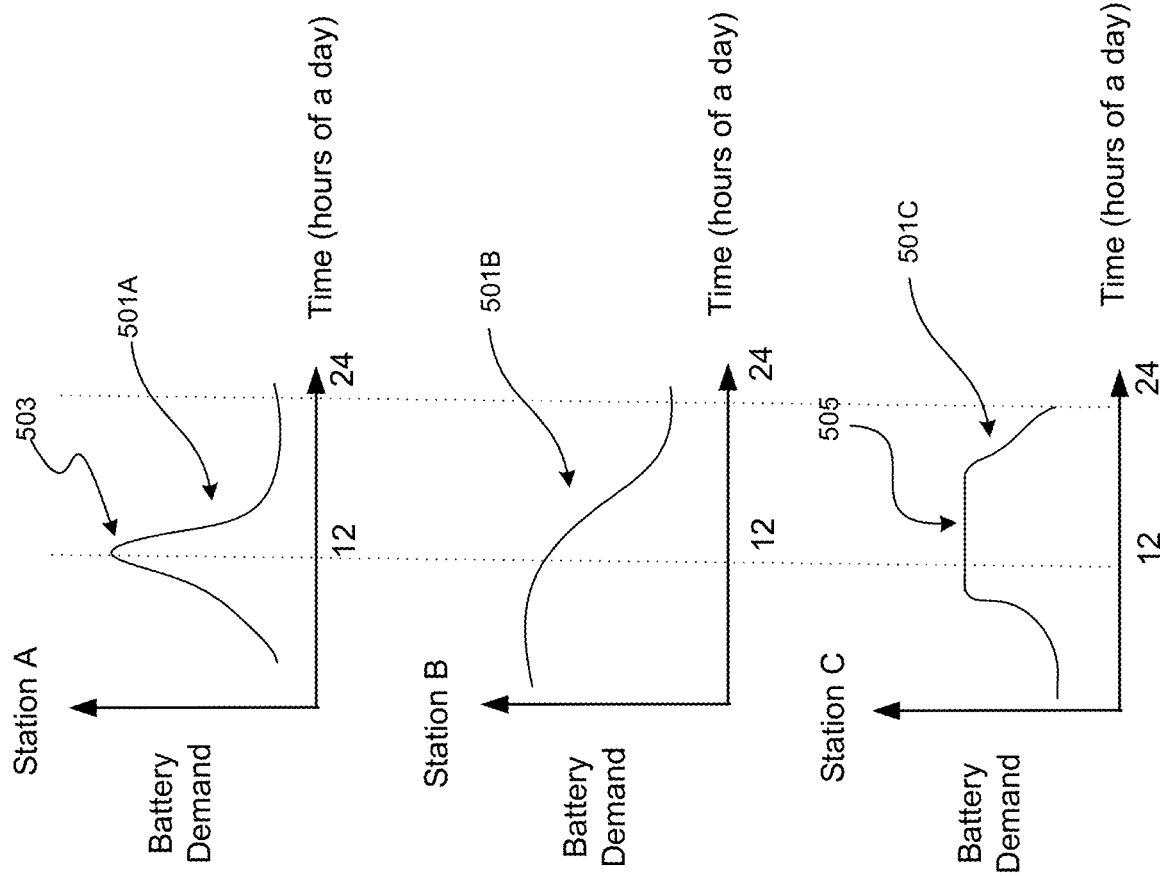
FIG. 5A shows a number of graphs illustrating characteristics of multiple station systems in accordance with embodiments of the disclosed technology.

In some embodiments, the present system can categorize the sampling stations (i.e., the battery exchange stations that contribute to the empirical information) based on their locations. For example, the sampling stations can be characterized as a "heavy-traffic" type, an "intermediate-traffic" type, or a "light-traffic" type based on the distances between a main traffic artery/road and the sampling stations. In some embodiments, the "heavy-traffic" type stations can be defined as stations within 1 kilometer of the main traffic artery, the "intermediate-traffic" type stations can be defined as stations ranging from 1 kilometer to 5 kilometers from the main traffic artery, and the "light-traffic" type stations can be defined as stations having at least 5 kilometers away from the main traffic artery. The present system can further identify battery demands for each type of stations during a particular period of time (e.g., within a day, as shown in FIG. 5A). In some embodiments, the "type" of stations could be categorized based on observations of certain patterns of particular reference factors and corresponding weight values thereof through data analyses or machine learning processes (e.g., a particular combination of references factors and corresponding weight values can be relevant, e.g., in proportion to one another). Some types derived from the above-described way can be "coded" with human-recognizable terms, such as "heavy-traffic" type or "light-traffic" type, and some types/patterns may not be characterized by human recognizable terms. In some embodiments, the "type" of battery exchange stations can also be considered as one of the reference factors when performing a demand prediction process.

In some embodiments, the battery demands can be described as the minimum number of fully-charged (or substantially-fully-charged) batteries necessary to satisfy all users who want to exchange batteries during the particular period of time. For example, the present system can determine that Station A needs to provide 123 fully-charged batteries during 8 a.m. to 11 a.m. on Mondays. In some embodiments, the battery demands can be described as the minimum amount of power (e.g., charging current in amperes, A) that is necessary to charge/maintain the minimum number of required fully-charged batteries before/during the particular period of time. For example, the present system can determine that, to enable Station A to provide 123 fully-charged batteries during 8 a.m. to 11 a.m., the required charging current is 5000 mA supplied from 5 a.m. to 7:30 a.m. on the same day.

Once the battery demands (or traffic throughput) are determined for each type of sampling station (e.g., the "heavy-traffic" type, an "intermediate-traffic" type, or a "light-traffic" type mentioned above), the present system can further use such information to predict a battery demand for a target battery exchange station. For example, the target battery exchange station can be a newly-deployed station within 1 kilometer from a heavy-traffic street similar to the main traffic artery mentioned above. In such embodiments, the present system can use the determined battery demands (e.g., described as demand curves shown in FIGS. 5A and 5B, or in other characteristic forms or patterns) to determine how to operate the target battery exchange station (e.g., how to charge/maintain the batteries therein during particular periods of time). By this arrangement, the present system enables an operator to maintain or control a battery exchange station in an energy-efficient manner.

In some embodiments, the present system can also categorize the sampling stations based on surrounding environmental conditions (e.g., close to a tourist attraction or an office building) and/or particular events (e.g., natural events such as typhoon, hurricane, severe weather conditions, cold/heat waves etc., or contrived events such as a professional sports game, special sales events, etc.). For example, the sampling stations can be characterized as a "city-commuter" type, a "tourist-attraction" type, or an "event-driven" type based on the surrounding environmental conditions. For example, the "city-commuter" type can have a battery demand pattern that has a high demand during peak commuting hours. As another example, the "tourist-attraction" type can have a battery demand pattern that has a high demand during holidays or weekends. Similarly, the "event-driven" type can have a battery demand pattern that has a high demand during the events.

In some embodiments, the present system can further categorize the sampling stations based on user behavior (e.g., the time, location, and frequency with which a user exchanges a battery, a user's driving/riding habits, a user's routes for operating a vehicle, a user's battery exchange plans (e.g., monthly pass or pay-as-you-go), user-subscribed battery performance packages such as a sports package for high performance, etc.) associated with the sampling stations. For example, the sampling stations can be characterized as primarily catering to "grocery-shopper" types, a "street-racer" types, or a "mountain-climber" types of users based on the surrounding environmental conditions. For example, the "grocery-shopper" type of users can have a battery demand pattern that indicates frequent short-distance travels to a particular location (e.g., a grocery store). The "street-racer" types can have a battery demand pattern that indicates its members are prone to hit a full throttle when staring their vehicles (e.g., the station is close to a professional racing track). The "mountain-climber" types can have a battery demand pattern that indicates its members are prone to take uphill routes when operating their vehicles (e.g., the station is close to an entrance of a mountain scenic pass).

In some embodiments, the sampling stations can be characterized based on their battery demands (e.g., the number of battery exchanges during a time period). For example, the sampling stations can be characterized as a "high-demand" type, an "intermediate-demand" type, or a "low-demand" type. For example, the "high-demand" type can have a battery demand pattern of 1000 or more battery exchanges per day, the "intermediate-demand" type can have a battery demand pattern of 100-1000 battery exchanges per day, and the "low-demand" type can have a battery demand pattern of 100 or fewer battery exchanges per day. In summary, characteristics like locations of the stations, demand distributions of weekdays and weekend, traffic throughput, environmental conditions, user behavior, etc. not only can be set as types to categorize the stations but also can be set as reference factors during the calculation using the model for predicting demand (e.g., Equation A to D). The system and the system operator can utilize these characteristics with a well-trained/updated calculation model to predict the demand of batteries through practical considerations.

In some embodiments, the present system can use machine learning techniques to enhance the accuracy of the battery demand prediction performed by the present systems. In some examples, the present system can use supervised machine learning techniques (e.g., to verify the result of the training and provide feedback) to improve the accuracy. For example, a system operator can adjust the factors to consider (or the importance thereof) as the system operator sees fit (e.g., based on actual data collected by the sampling stations). For example, Equation A, B, and D can also be calculated and derived through processes of supervised learning. In some embodiments, the present system can use unsupervised machine learning techniques (e.g., to enable the system to independently determine how to train and improve) to improve the accuracy. For example, a system operator can set up a goal (e.g., to minimize energy consumption of all battery stations, to meet all battery demands, etc.) or an objective function associated with the goal for the system to determine how to achieve the goal or to solve the objective function.

Another aspect of the present disclosure is to provide an updated demand information at all times (or, in a real-time or near real-time manner). For example, when a new event/data like a new user subscribes to a battery plan that enables the user to exchange batteries in existing battery exchange stations, the present system can determine how this event may affect a predicted demand by the model, for example, a type of the new user can be determined and a corresponding battery demand pattern an also be determined accordingly. For example, questionnaires or surveys can be used to determine the type of the new user. For example, the system can ask the new user to self-identify or select which type of user he/she is. Alternatively, the system can analyze information provided by the new user (e.g., age, gender, residential address, commuting routes, etc.) to determine a type of the new user. For example, the new user can be identified as a "high-demanding" type at least because the new user purchases a "high-performance" battery package (e.g., a battery subscription plan to use high-performance batteries or having a priority to exchange batteries, etc.). In such embodiments, the present system will take into account the impact of the new user in its future analysis and prediction based on the identified type. In some embodiments, similarly, when a new battery exchange station is deployed, the present system will also take into consideration its impact in its future analysis and prediction. In some embodiments, the user type can vary in different time periods (e.g., a user can be a "commuter" type during weekdays and a "racer" type during the weekends. As a result, the present system is capable of providing updated and thus accurate analysis result for battery demand prediction.

In some embodiments, the present system enables each of the battery exchange stations to be operated "offline." In such embodiments, the present system provides a set default rules and patterns for each of the battery exchange stations to follow, provided that the battery exchange stations do not receive further (or updated) instructions from a server. For example, the server can send a battery demand prediction to each of the stations for the next day (e.g., with one hour time interval), and each of the stations can use its demand prediction as the default rules for operation, provided that there is no further instruction from the server. For example, some stations may be at a place where a network connection can be interrupted from time to time. In these cases, these stations can still function properly when they are offline (e.g., not connected to the server). The present system can also set up a set of rules regarding "aging instructions" for these stations to follow. For example, the present system can instruct these stations to follow the previous instructions transmitted by the server as long as the previous instruction was created no more than 2 hours ago. Once the 2-hour threshold is met, these stations can go back to default demand rules (e.g., the above-mentioned next-day demand predictions) or patterns that are stored in these stations. In other embodiments, the rules and the time threshold can vary depending on various factors such as the locations/types of the stations.

In some embodiments, the present system can predict a battery demand based on a user request (e.g., a user reserves batteries) or one or more triggering events. Embodiments of the triggering events include, for example, a power outage, a surge of battery demand that was not considered by the system as a reference factor in its previous prediction, an accident, a natural disaster, etc. In such embodiments, the system can initiate a prediction analysis in response to the triggering event and transmit the analysis result to the multiple stations. For example, during the calculation using the model for predicting demands, the system can associate the newly-set reference factor to the affected time periods (which may be empirical information from the time doing this analysis) and do the training/updates for the weighting values, so as to improve the accuracy of the demand prediction.

This disclosure describes systems and methods designed to provide battery demand predictions in a real-time (e.g., milliseconds to seconds) or near real-time (e.g., minutes to hours) manner. Various embodiments may provide one or more of the following technological improvements: (1) efficient real-time or near real-time battery demand prediction; (2) the ability to effectively instruct one or more battery exchange stations to charge and/or maintain battery therein;

(3) the ability to enable an operator to set up desirable battery charging rules based on multiple factors such as the locations of the stations, the locations of the batteries (e.g., including those not located in the stations), environmental conditions, events, etc.; and (4) ability to provide enhanced user experiences by offering satisfying battery experience in an energy-efficient fashion.

In some embodiments, the charging rules described therein can be characterized, determined, defined, predicted, and/or "trained" based on historical data collected by the disclosed system and can be further adjusted based on updated data (e.g., new battery usage data, new user behavior data, etc.). In some embodiments, the charging rules can be updated every day/week/month/season based on the updated data.

In some embodiments, the disclosed system can perform a simulation for a new or an updated battery charging plan, such that a station system can locally determine whether to implement the new or updated battery charging plan. For example, the system can determine that a first battery exchange station was turned offline for regular maintenance (e.g., turn offline for one day, a couple of hours or a time interval that is predicted by a server). The system then generates an updated battery charging plan for a second battery exchange station close to the first battery exchange station. For example, the system determines that turning the first battery exchange station offline results in an increase of the battery demand for the second battery exchange station. Accordingly, the system sends an updated battery management plan to the second battery exchange station. After receiving the updated battery charging plan, the second battery exchange station can perform a simulation for the updated battery charging plan. The simulation is performed as a background process that does not substantially interfere with the implementation of an existing battery management plan. In some embodiments, the simulation includes simulating a charging process for a battery positioned in the second battery station, based on the updated battery charging plan. In some embodiments, the simulation includes simulating whether implementing the updated battery management plan can generate a sufficient number of charged batteries to meet the actual demand. For example, due to the expected demand increase, a simulated battery charging plan may request the second battery station to charge its batteries at an increased charging rate faster than a normal rate (which is used is the existing battery charging plan). After a period of time (e.g., 12 hours), the simulation result is generated (e.g., charging at the increased charging rate results in a 5-degree-Celsius temperature increase for the whole station). The simulation result is then compared to the actual demand. For example, the actual demand indicates that using the normal rate to charge the batteries still meets the actual demand in the past 12 hours (e.g., there was no user waiting for reserved batteries). In such embodiments, the second battery station can determine not to implement the updated battery charging plan. Embodiments regarding charging plans are described in applicant's co-pending applications, which are herein incorporated by reference.

In the following description, for the purposes of explanation, numerous specific details are set forth in order to provide a thorough understanding of embodiments of the present technology. It will be apparent, however, that embodiments of the present technology may be practiced without some of these specific details.

FIG. 1 is a schematic diagram illustrating a system 100 in accordance with embodiments of the disclosed technology. As shown, the system 100 includes one or more battery exchange stations 101A-D, a main server 103, a database 105, and a network 107. As shown, the battery exchange stations 101A, 101D are wirelessly coupled to the main server 103 via the network 107. The battery exchange stations 101B, 101C are coupled to the main server 103 via the network 107 via wired connections. The main server 103 is further coupled to the database 105, which can store reference information (e.g., the battery demand reference information discussed above).

Using the battery exchange station 101A as an example, in the illustrated embodiment, the station 101A can include a battery exchange rack 113 and a user interface 115 (e.g., a display) positioned thereon. As shown, the battery exchange rack 113 can include eight battery slots 117a-h to accommodate batteries. During operation, there are only six battery slots (e.g., slots 117a, 117b, 117d, 117e, 117f, and 117h) are occupied by batteries, and the remaining two slots (e.g., slots 117c and 117g) are reserved for a user to insert batteries to be exchanged (e.g., low power batteries). In some embodiments, the battery exchange stations 101A-D can have different arrangements such as different numbers of racks, displays, and/or slots. In some embodiments, the battery exchange stations 101A-D can include modular components (e.g., modular racks, modular displays, etc.) that enable an operator to conveniently install or expand the battery exchange stations 101A-D. The battery exchange stations 101A-D can be electrically coupled to one or more power sources (e.g., power grid, power lines, power storage, power station/substations, solar cells, wind-powered generators, etc.) to receive electric power to charge the batteries positioned therein and to perform other operations (e.g., to communicate with the main server 103).

In some embodiments, a processor within the station 101A can be programmed to require a user to insert a battery before the user removes another battery from the station 101A. In some embodiments, the station 101 does not have such a requirement. In some embodiments, the station 101A allows a user to remove or insert a particular number of batteries (e.g., two) in one transaction. In other embodiments, however, the station 101A can allow a user to remove or insert other numbers (e.g., one, three, four, etc.) of batteries in one transaction. In some embodiments, the station 101 can have a locking mechanism for securing the batteries positioned therein. In some embodiments, the station 101 can be implemented without the locking mechanism.

In some embodiments, the main server 103 can be an edge server that receives client requests and coordinates fulfillment of those requests through other servers, such as servers 109A-C. The servers 109A-C are further coupled to databases 111A-C. Although each of the main server 103 and the servers 109A-C is displayed logically as a single server, these servers can each be a distributed computing environment encompassing multiple computing devices located at the same or at geographically disparate physical locations.

In some embodiments, the main server 103 and the servers 109A-C can each act as a server or client to other server/client devices. As shown, the main server 103 connects to the database 105. The servers 109A-C can each connect to one of the databases 111A-C. As discussed above, each of the main server 103 and the servers 111A-C can correspond to a group of servers, and each of these servers can share a database or can have its own database.

The databases 105, 111A-C can store information associated with the present disclosure (e.g., empirical information regarding exchanges of energy storage devices from each of the plurality of device-exchange stations, calculation model for predicting demand, list of reference factors, information collected by the main server 103, information analyzed by the main server 103, information generated by the main server 103, reference information, user account information, user battery plans, user histories, user behavior, user habits, etc.). In some embodiments, at least one of the databases 111A-C can be a publicly accessible database (e.g., weather forecast database, travel alert database, traffic information database, location service database, map database, etc.) maintained by government or private entities (and certain reference factors therein can be associated with one another or with a particular time period). In some embodiments, at least one of the databases 111A-C can be a private database that provides proprietary information (e.g., user account, user credit history, user subscription information, etc.). In some embodiments, the servers 109A-C and/or the databases 111A-C are operated by a cloud service provider, and the main server 103 and/or the database 105 are operated by a battery service provider (e.g., who offers a user multiple battery exchange plans).

In the illustrated embodiments, the main server 103 include processors that are programmed to collect information regarding battery demands from the battery exchange stations 101A-D. For example, the collected information can include, (1) the locations of the battery exchange stations 101A-D; (2) the numbers of the batteries located in the battery exchange stations 101A-D; (3) the numbers/locations of the batteries not located in the battery exchange stations 101A-D (e.g., the batteries are currently installed in vehicles or otherwise held or stored by users); (4) the status of charge (e.g., state of charge, SOC) of the above-mentioned batteries; (5) the usage histories of the batteries; (6) events (e.g., the triggering event discussed above) close to the battery exchange stations 101A-D; (7) environmental conditions close to the battery exchange stations 101A-D; (8) user behavior (e.g., battery usage, user driving/riding history, user behavior, user habits, etc.) associated with the sampling stations or the batteries; and/or (9) other suitable information.

As discussed above, the main server 103 can be used to perform the process/calculation associated with Equations (A)-(F), i.e., the "model" for predicting demands. For example, the mains server 103 can (1) receive empirical information regarding exchanges of energy storage devices from each of the battery exchange stations 101A-D in an initial time period; (2) determine a target time period; (3) identify a plurality of reference factors corresponding to each of the battery exchange stations 101A-D in the target time period; (3) determine demand information during the target time period for each of the battery exchange stations 101A-D based on the identified reference factors and weighting values associated with the identified reference factors; and (4) form a plurality of charging plans for each of the battery exchange stations 101A-D according to demand information during the target time period.

After collecting such information, the processors of the main server 103 then analyze the collected information to identify characteristics or patterns for the battery exchange stations 101A-D. For example, the main server 103 can determine one or more battery demand characteristics/patterns based on the analysis. The determined characteristics/patterns can then be used as guidance for operating the battery exchange stations 101A-D or for operating other battery exchange stations coupled to the main server 103. Embodiments regarding operations of the main server 103 are discussed below with reference to FIG. 2.

The network 107 can be a local area network (LAN) or a wide area network (WAN), but it can also be other wired or wireless networks. The network 107 can be the Internet or some other public or private network. The battery exchange stations 101A-D can be connected to the network 107 through a network interface, such as by wired or wireless communication. While the connections between the main server 103 and the servers 109A-C are shown as separate connections, these connections can be any kind of local, wide area, wired, or wireless network, including the network 107 or a separate public or private network. In some embodiments, the network 107 includes a secured network that is used by a private entity (e.g., a company, etc.).

Figure 2:
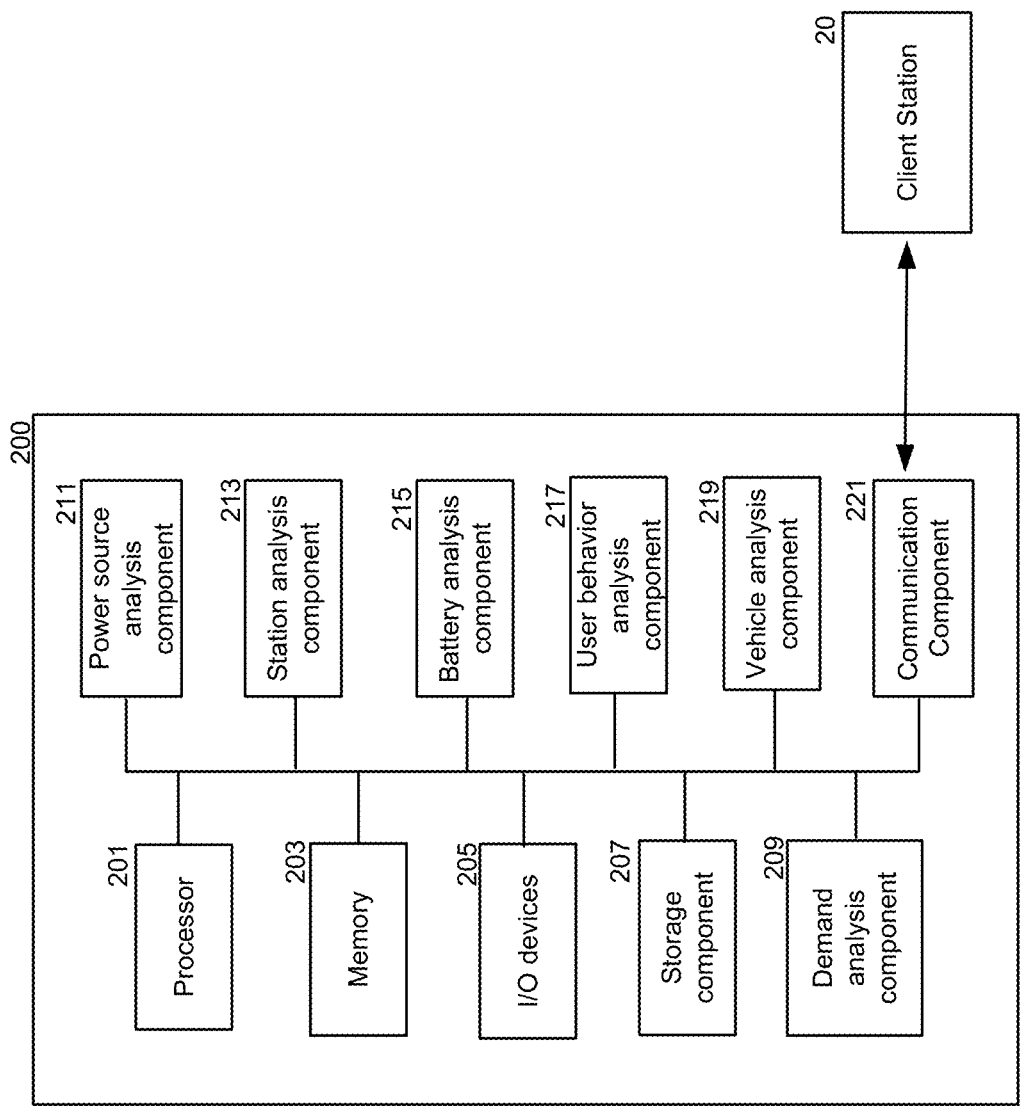
FIG. 2 is a schematic diagram illustrating a server system in accordance with embodiments of the disclosed technology.

FIG. 2 is a schematic diagram illustrating a server system 200 in accordance with embodiments of the disclosed technology. The server system 200 is configured to collect information associated with multiple batteries that can be deployed or managed by the system 200. The server system 200 is also configured to analyze the collected information and transmit, based on the analysis, a signal or an instruction to a client station 20 to control a process (e.g., a charging process) therein. In some embodiments, the client station 20 can be implemented as the battery exchange stations 101A-D discussed above. In other embodiments, the client station can be implemented as other suitable client devices.

As shown in FIG. 2, the server system 200 includes a processor 201, a memory 203, input/output (I/O) devices 205, a storage component 207, a demand analysis component 209, a power source analysis component 211, a station analysis component 213, a battery analysis component 215, a user behavior analysis component 217, a vehicle analysis component 219, and a communication component 221. The processor 201 is configured to interact with the memory 203 and other components (e.g., components 205-221) in the server system 200. In some embodiments, the processor 201 can be a single processing unit or multiple processing units in a device or distributed across multiple devices. The processor 201 can be coupled to other hardware devices, for example, with the use of a bus, such as a PCI (Peripheral Component Interconnect) bus or SCSI (Small Computer System Interface) bus. The processor 201 can communicate with a hardware controller for devices, such as for the components 205-221.

The memory 203 is coupled to the processor 201 and is configured to store instructions for controlling other components or other information in the server system 200. In some embodiments, the memory 203 can include one or more of various hardware devices for volatile and non-volatile storage, and can include both read-only and writable memory. For example, the memory 203 can comprise random access memory (RAM), processor registers, read-only memory (ROM), writable non-volatile memory, flash memory, device buffers, and so forth. The memory 203 is not a propagating signal divorced from underlying hardware and accordingly is non-transitory. The memory 203 can further include a program memory that stores programs and software, such as an operating system. The memory 203 can also include a data memory that can store information associated with the server system 200.

The I/O devices 205 are configured to communicate with an operator (e.g., receive an input therefrom and/or present information thereto). In some embodiments, the I/O devices 205 can be one component (e.g., a touch screen display). In some embodiments, the I/O devices 205 can include an input device (e.g., keyboards, pointing devices, card reader, scanner, camera, etc.) and an output device (e.g., a display, network card, speaker, video card, audio card, printer, speakers, or other external device).

The storage component 207 is configured to store, temporarily or permanently, information/data/files/signals associated with the server system 200 (e.g., collected information, reference information, information to be analyzed, analysis results, etc.). In some embodiments, the storage component 207 can be a hard disk drive, flash memory, or other suitable storage means. The communication component 221 is configured to communicate with other systems (e.g., the client station 20 or other stations) and other devices (e.g., a mobile device carried by a user, a vehicle, etc.).

The demand analysis component 209 can be a set of instructions executable by a processor to collect and store (e.g., in the storage component 207) information to be analyzed. The collected information can include one or more of (1) the locations of multiple sampling stations (e.g., in some embodiments, including the client station 20; in other embodiments, however, not including the client station 20); (2) the numbers of the batteries located in the multiple sampling stations; (3) the numbers and locations of the batteries not located in the multiple sampling stations; (4) battery information regarding battery manufacturers, production dates/batches, the number of charging cycles that a battery has gone through, working temperatures (including a battery cell temperature, a battery circuit temperature, etc.) that a battery has experienced, charging/discharging energy amount/rates of batteries, full/current charging capacities of the batteries (e.g., full-charge capacity, FCC, state of charge, SOC, etc.), battery cell types, battery hardware/firmware versions, battery state of health, SOH, battery age (e.g., by time or by charging cycle counts), battery direct current internal resistance, DCIR, and/or other suitable battery information (e.g., battery error notices, status, messages, etc.); (5) activities or events that can potentially change users' battery experience (e.g., the way users utilize/exchange batteries); (6) environmental conditions that can potentially change users' battery experience; and/or (7) user profile information regarding user battery plans user driving/riding histories, user behavior, user habits, etc. After receiving the collected information, the demand analysis component 209 can analyze the collected information. Each type of collected information above can be analyzed to identify characteristics/patterns for this particular type of collected information (e.g., in a form of characteristic curves shown in FIGS. 5A and 5B, to be discussed in detail below). These identified characteristics/patterns can be considered, individually or in combination, by the demand analysis component 209 to generate a battery demand prediction (e.g., by the model for predicting demands associated with Equations A-F described above) for the client station 20.

Figure 5B:
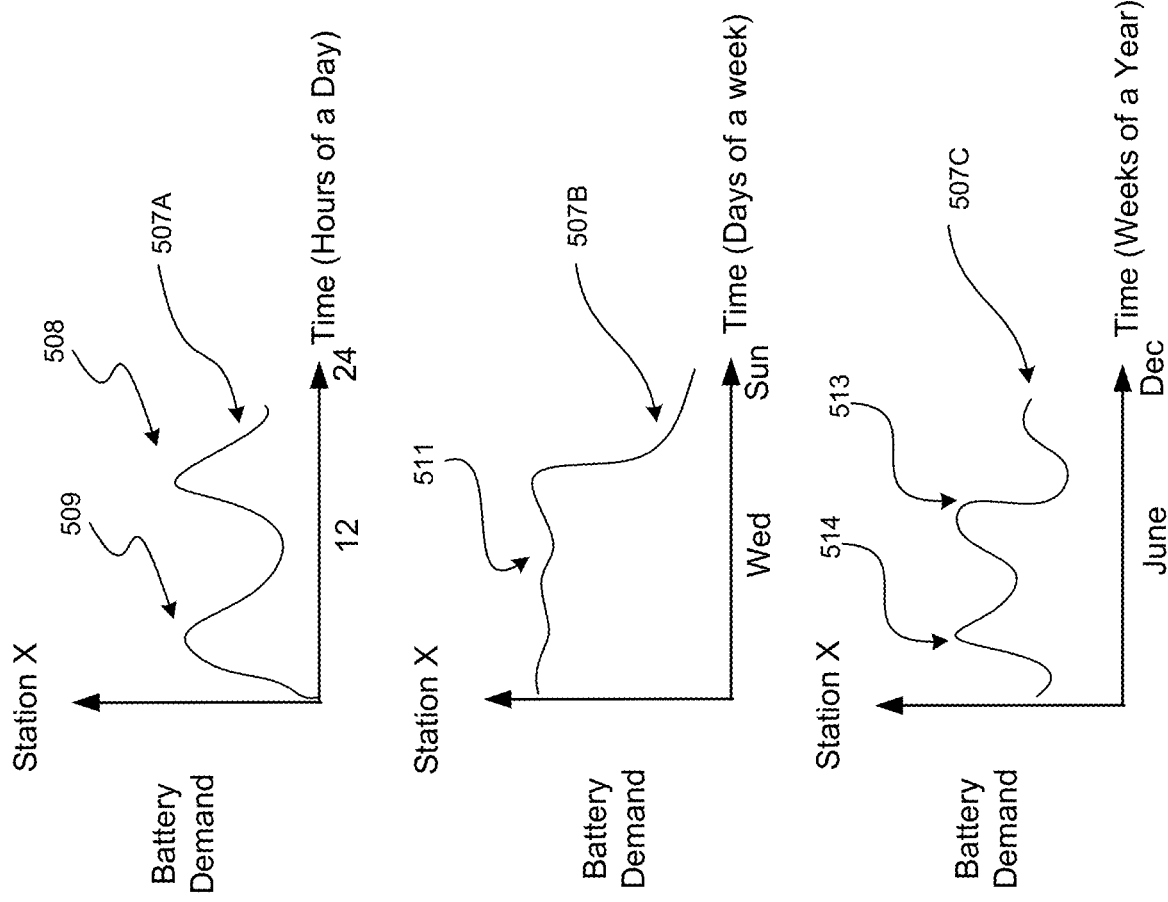
FIG. 5B shows a number of graphs illustrating characteristics during multiple time frames of a station system in accordance with embodiments of the disclosed technology.

In some embodiments, the demand analysis component 209 can execute instructions to prioritize the collected information and reference factors based on their relative importance or reliability. For example, the demand analysis component 209 can use the "locations of the stations" as a primary factor and set other items as secondary factors when determining a battery demand prediction for the client station 20. In such embodiments, the system 200 can identify a predicted daily battery demand curve (e.g., as shown in FIGS. 5A and 5B, to be discussed in detail below) for the client station 20 based on the locations of the sampling stations. The demand analysis component 209 can then execute instructions to consider other secondary factors to adjust the identified daily battery demand curve. For example, the demand analysis component 209 can increase the battery demand prediction if it determines that expected users for the client station 20 are high-demand users, based on the user profile information. In some embodiments, for example, the demand analysis component 209 can adjust the battery demand prediction based on the result of a machine learning process mentioned above.

In some embodiments, the demand analysis component 209 executes instructions to give different types of collected information different weightings and the types are to be treated as reference factors in calculating the model for predicting demands associated with Equations A-F described above. For example, the demand analysis component 209 can set the weightings for the "locations of the stations," the "user behavior," the "events close to the stations" and the "environmental condition" as 50%, 20%, 15%, and 15%. In such embodiments, the identified characteristics/patterns for each type of collected information can then be combined based on the foregoing weightings. In some embodiments, the demand analysis component 209 can execute instructions to determine which types of collected information to be included in the prediction and the corresponding weightings based on empirical studies, results of a machine learning process, and/or system operator's preference.

In some embodiments, the demand analysis component 209 is a series of executable instructions to determine the priorities or weightings for each type of the collected information based on the reliability of the collected information. For example, for information measured and collected from memories coupled to the batteries, the demand analysis component 209 is programmed to give it higher weighting or priority because the system 200 considers such information is direct/internal and thus more reliable than indirect/external information such as environmental conditions (e.g., a weather forecast, an event notice, etc.). Embodiments of the information stored in the memory coupled to a battery include, for example, (1) battery manufacturing information, (2) battery basic characteristics, and (3) battery usage.

Examples of the battery manufacturing information can include the identity of the battery manufacturer (e.g., batteries made by different manufacturers may have different characteristics, although their battery specifications may be the same), manufacturing dates (e.g., batteries made on different dates may have different characteristics), manufacturing batches (e.g., batteries made in different batches may still have different characteristics), battery hardware/firmware versions, and/or manufacturing serial numbers (e.g., individual batteries can have different characteristics).

Examples of the battery basic characteristics include a battery capacity (e.g., full charge capacity, FCC), a battery discharging capacity (e.g., how much power can a battery provide under certain conditions), battery cell types, battery direct current internal resistance (DCIR), and/or a suggested battery working temperature (e.g., a temperature range such as 5 to 35 degrees Celsius, including a battery cell temperature and a battery circuit temperature). Other examples of the battery basic characteristics can include a suggested battery charging temperature (e.g., a temperature range such as 25 to 40 degrees Celsius), a suggested battery charging current (e.g., a constant or regulated current), a suggested battery charging voltage (e.g., a constant or regulated voltage), a suggested battery charging cycle (e.g., at least one full charging per week), a suggested battery charging speed (e.g., increasing 10% state of charge, SOC, of a battery in 5 minutes), a suggested full charge point (e.g., 98% of its FCC), and/or a suggested battery charging time (e.g., not to be continuously charged for more than 5 hours).

Examples of battery usage include an actual battery charging temperature history (e.g., a battery was charged yesterday at 30 degrees Celsius and at 35 degrees Celsius earlier today for 25 minutes), an actual battery charging current (e.g., 1-200 Amperes), an actual battery charging voltage (e.g., 1-220 volts), an actual battery charging cycle (e.g., a battery has been through 50 full charge cycles and 125 partial cycles), an actual battery charging speed or charging rate (e.g., 20 Amperes per hour), an actual battery charging time (e.g., a battery was charged for 56 minutes yesterday), an actual battery working temperature (e.g., a battery was operating at 35 degrees Celsius yesterday for 2 hours), and an actual battery discharging time (e.g., a battery was discharged at its full current capacity for 66 minutes yesterday).

In some embodiments, the demand analysis component 209 can communicate and work together with other components in the system 200 (e.g., components 211-219) to generate the battery demand prediction for the client station 20. In some embodiments, however, the system 200 can operate without components 211-219.

The power source analysis component 211 can be a number of executable instructions to analyze the status (e.g., reliability, stability, continuity, etc.) of one or more power sources that are used to power the client station 20 for charging the batteries therein. For example, the power source analysis component 211 can determine that a power source used to supply power to the client station 20 will be interrupted during 1 a.m. to 3 a.m. on a particular date, and then the power source analysis component 211 can accordingly adjust a charging instruction to the client station 20 based on the battery demand prediction. For example, the original battery demand prediction can indicate that the client station 20 needs 5 fully-charged batteries during 2 a.m. on the particular date. Due to the determined possible power supply interruption, the power source analysis component 211 can instruct the client station 20 to charge the batteries needed prior to 1 a.m. on the particular date.

In some embodiments, the power source analysis component 211 can execute instructions to consider the cost for charging in different time periods. For example, the power source analysis component 211 can determine that the charging cost from a power source is reduced during off-peak hours. The power source analysis component 211 can determine whether it is feasible for the client station 20 to charge its batteries during the off-peak hours based on the battery demand prediction from the demand analysis component 209. If so, the power source analysis component 211 can instruct the client station 20 to charge the batteries during these off-peak hours to reduce charging costs.

The station analysis component 213 can be a series of executable instructions to categorize the multiple sampling stations into various types and identify representative characteristics/patterns for each type, such that the demand analysis component 209 can use such information as basis for its analysis. For example, the station analysis component 213 can analyze the collected information and divide the multiple sampling stations into various types based on the battery demands. For example, the stations can be categorized as "high-demand-all-time," "high-demand-peak-hours," "high-demand-holidays," "high-demand-weekends," "high-demand-events," and "low-demand-all-time." In some embodiments, the "high-demand-all-time" type can indicate that the station is located on a busy street. The "high-demand-peak-hours" type can infer that the station is frequently visited by commuting users during the peak hours. The "high-demand-holidays" type or the "high-demand-weekends" type can indicate that such stations are located at a tourist attraction or a site-seeing point. The "high-demand-events" type can mean that the station is located at an event-holding facility or stadium. The "low-demand-all-time" can indicate that the station is a strategic station that is built up as a relay station between two major cities. Based on these types, the demand analysis component 209 and the station analysis component 213 can quickly determine a suitable battery demand prediction for the client station, especially in cases where the collected information is insufficient for the demand analysis component 209 to perform a normal analysis.

Similar to the station analysis component 213, the battery analysis component 215, the user behavior analysis component 217, and the vehicle analysis component 219 are programmed instructions to categorize the batteries, user behavior, and vehicles powered by the batteries, respectively, into various types and identify representative characteristics/patterns for each type. For example, the battery analysis component 215 can categorize the batteries based on their manufacturers, ages, original full charge capacities (FCCs), current FCCs, charging cycles, experienced working temperatures, charge/discharge rules/profiles (e.g., steady or having peaks), etc. Such types or categories can facilitate the demand analysis component 209 to fine tune its battery demand prediction (and the corresponding charging instructions) for the client station 20, provided the system 200 knows what types of batteries are positioned in the client station 20 (e.g., such information can be provided to the server 200 by the client station 20).

Similarly, the user behavior analysis component 217 can be a series of executable instructions to categorize the user behavior based on how they exchange and/or use the batteries. For example, a user can be very demanding on battery performance (e.g., a professional racer). As another example, another user may only use battery to power its vehicle for daily errands (e.g., picking up children or grocery shopping). In such embodiments, the disclosed system can accordingly predict user's daily or weekly battery exchanges routines, the frequency of battery exchange, etc. Once a user reserves a battery at the client station 20, the client station 20 then provides information associated with the reservation to the server system 200. The server system 200 can then determine the type/category of the user who made the reservation and accordingly adjust the battery demand prediction (and the corresponding charging instructions) for the client station 20. In some embodiments, such adjustment can be made by the client station 20.

The vehicle analysis component 219 can be a series of executable instructions to categorize the types of vehicles that users are planning to operate. For each type of vehicles, the vehicle analysis component 219 can determine which types of batteries work best for each type of vehicles. For example, the vehicle analysis component 219 can determine that an electric scooter works best with a specific type of battery after a particular charging process. In such embodiments, the vehicle analysis component 219 can work with the demand analysis component 209 to adjust the battery demand prediction (and the corresponding charging instructions), if the server system 200 receives related vehicle information. In some embodiments, such information can be found in the user profiles or account information. In other embodiments, such vehicle information can be provided by the client station 20 to the server system 200.

In some embodiments, the server system 200 can provide the battery demand prediction to the client station 20 in a real-time or near real-time manner. In such embodiments, the server system 200 monitors the status of the client station 20. Once there is a change (e.g., a user just removed two fully-charged batteries and left two empty ones at the client station 20) or a potential change (e.g., a user makes a reservation to exchange batteries at the client station 20) that may affect the charging process of the client station 20, the server system 200 can perform the analysis mentioned above and generate an updated battery demand prediction for the client station 20 to follow. In some embodiments, the change or potential change can be transmitted to the server system 200 from a mobile device (e.g., a user uses an app installed thereon to make a battery reservation), another server (e.g., a web-service server associated with an app used by a user), and/or the client station 20.

In some embodiments, the client station 20 can be a new client station (e.g., not included in the sampling stations). In such embodiments, the server system 200 can generate the battery demand prediction based on previously collected information and/or previously analysis performed by the server system 200 (e.g., as reference information). For example, the server system 200 can determine that the client station 20 can be a certain type of station (e.g., the "heavy-traffic" type, the "intermediate-traffic" type, the "light-traffic" type, the "city-commuter" type, the "tourist-attraction" type, the "event-driven" type, etc.) and then generate the battery demand prediction based on the determined type.

In some embodiments, the server system 200 can manage multiple client stations simultaneously. In such embodiments, the server system 200 can monitor these client stations, collect information therefrom, and generate the battery demand prediction for each of the client stations.

Figure 3:
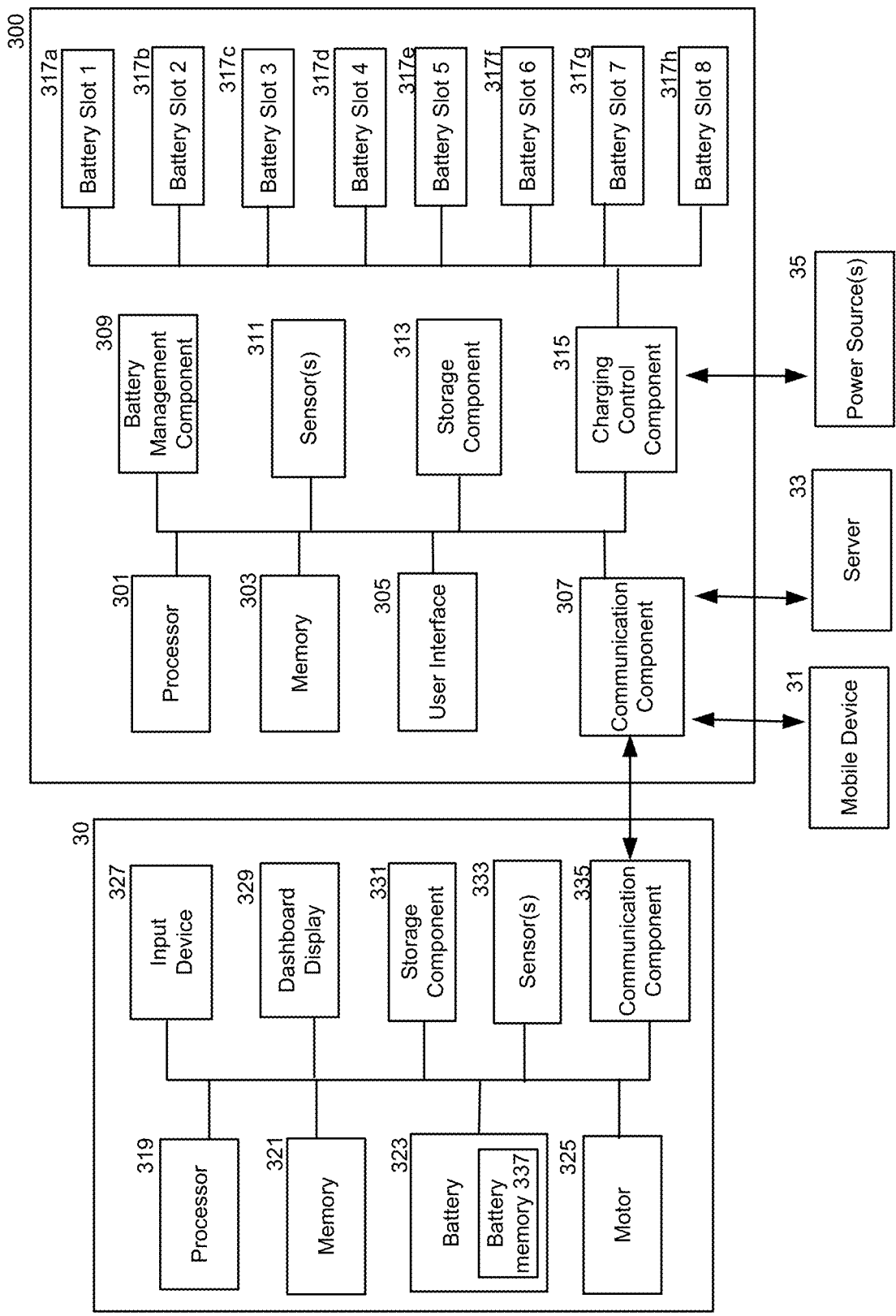
FIG. 3 is a schematic diagram illustrating a station system and a vehicle system in accordance with embodiments of the disclosed technology.

FIG. 3 is a schematic diagram illustrating a station or station system 300 and a vehicle or a vehicle system 30 in accordance with embodiments of the disclosed technology. As shown, the station system 300 includes a processor 301, a memory 303, a user interface 305, a communication component 307, a battery management component 309, one or more sensors 311, a storage component 313, and a charging component 315 coupled to eight battery slots 317a-h. The processor 301 is configured to interact with the memory 303 and other components (e.g., components 305-317) in the station system 300. The memory 303 is coupled to the processor 301 and is configured to store instructions for controlling other components or other information in the station system 300.

The user interface 305 is configured to interact with a user (e.g., receiving a user input and presenting information to the user). In some embodiments, the user interface 305 can be implemented as a touchscreen display. In other embodiments, the user interface 305 can include other suitable user interface devices. The storage component 313 is configured to store, temporarily or permanently, information, data, files, or signals associated with the station system 300 (e.g., information measured by the sensors 313, information collected by the batteries 317a-h, reference information, charging instructions; user information, etc.). The communication component 307 is configured to communicate with other systems (e.g., the vehicle system 30, a server 33, and/or other station stations) and other devices (e.g., a mobile device 31 carried by a user).

The battery management component 309 can be a series of executable instructions to manage and control the batteries positioned in the battery slots 317a-h. In some embodiments, the battery management component 309 can manage the batteries based on instructions from the server 33 (which can function in the ways similar to the server system 200, in some embodiments). In some embodiments, the battery management component 309 can manage the batteries based on predetermined instructions or guidance stored in the station system 300 (e.g., in the storage component 313). In some embodiments, the battery management component 309 can periodically communicate with the server 33 to request update instructions.

In some embodiments, the battery management component 309 can also execute instructions to collect information regarding one or more of the batteries positioned in the battery slots 317a-h, information regarding the station system 300, information regarding one or more power sources 35, information regarding a user (e.g., received from the mobile device 31 via the communication component 307), and/or information regarding the vehicle system 30. The battery management component 309 can transmit or upload the collected information to the server 33 for further analysis or process.

The sensors 311 are configured to measure information associated with the station system 300 (e.g., working temperature, environmental conditions, power connection, network connection, etc.). The sensors 311 can also be configured to monitor the batteries positioned in the battery slots 317a-h. The measured information can be sent to the battery management component 309 and the server 33 for further analysis.

The charging component 315 is configured to control a charging process for each of the batteries positioned in the battery slots 317a-h. In some embodiments, the station system 300 can include other numbers of battery slots. The battery slots 317a-h are configured to accommodate and charge the batteries positioned and/or locked therein. The charging component 315 receives power from the power sources 35 and then uses the power to charge the batteries positioned in the battery slots 317a-h, based on a predetermined charging plan (e.g., a set of instructions indicative of when and how to charge a battery to achieve a goal such as maximizing the life span of the battery, including, for example, controlling a charging temperature during various charging stages of the battery) received from the server 33 or stored in the storage component. In some embodiments, the charging plan can be determined based on a battery demand prediction generated by the server 33.

As shown in FIG. 3, the vehicle 30 can be implemented as an electric scooter, an electric car, etc. The vehicle 30 includes a processor 319, a memory 321, a battery 323, a motor 325, an input device 327, a dashboard display 329, a storage device, one or more sensors 333, and a communication component 335. The processor 319 is configured to interact with the memory 321 and other components (e.g., components 323-335) in the vehicle system 30. The memory 321 is coupled to the processor 319 and is configured to store instructions for controlling other components or other information in the vehicle system 30. The storage device 331 can have similar functions as the storage component 313 or 207. The communication component 335 can have similar functions as the communication component 307 or storage component 313 or 221. The dashboard display 329 is configured to visually present information to a user (e.g., information associated with the vehicle system 30).

The battery 323 is configured to power the motor 325 such that the motor 325 can move the vehicle system 30. The battery 323 can be an exchangeable battery. When the battery 323 is running out of power, a user of the vehicle system 30 can exchange or swap the battery 323 at the station system 300. For example, the user can remove the battery 323 from the vehicle system 30 and then position the battery 323 in one of the battery slots 317a-h (e.g., an empty one without a battery positioned therein). The user can then take a fully-charged battery in the battery slots 317*a-h* and then install it in the vehicle system 30.

In some embodiments, when the user positions the battery 323 in one of the battery slots 317*a-h*, the station system 300 can detect the existence of that battery and pull information therefrom. For example, the battery management component 309 can pull information associated with that battery (e.g., battery usage history, battery identity, charging cycles, full charge capacity, vehicle information of the vehicles that the battery 323 has been associated with, user activities that the battery 323 has been involved, etc.) from a battery memory 337 inside, or coupled to, the battery 323. In some embodiments, the information in the battery memory 337 can be transmitted to the server 33 via the communication component 335 or via the mobile device 31.

Figure 4:
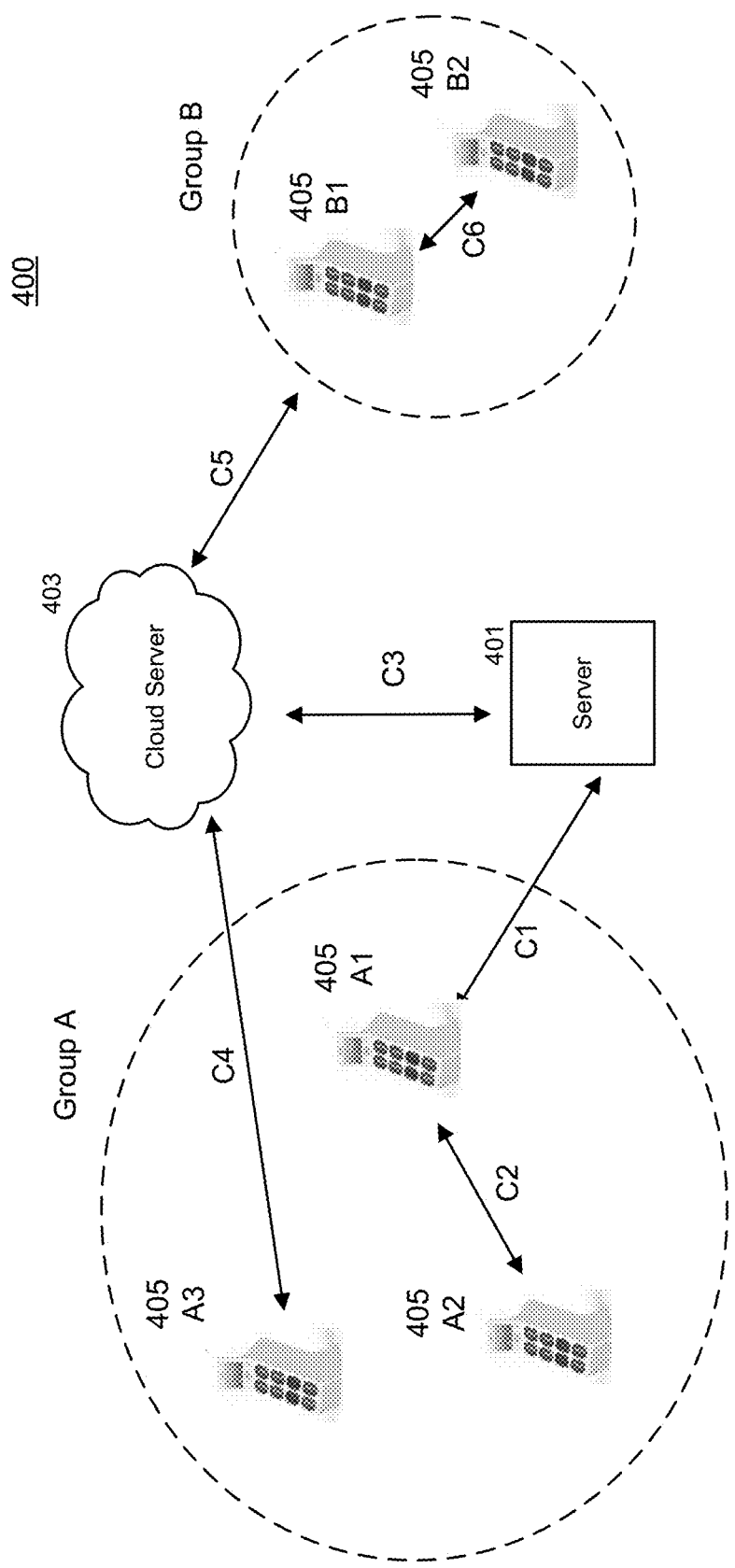
FIG. 4 is a schematic diagram illustrating a cloud system in accordance with embodiments of the disclosed technology.

FIG. 4 is a schematic diagram illustrating a cloud system 400 in accordance with embodiments of the disclosed technology. The cloud system 400 can include a server 401, a cloud server 403, and multiple stations 405 (annotated as 405A1-A3 and 405B1-B2). The server 401 is configured to collect information from the multiple stations 405, analyze the collected information, and generate a power demand prediction (e.g., a battery demand prediction). The server 401 can have functions similar to those of the server system 200. The cloud server 403 is configured to facilitate the communication between the server 401 and the multiple stations 405.

As shown in FIG. 4, the multiple stations 405 can be divided into Group A (including stations 405A1-A3) and Group B (including stations 405B1-B2). For example, the stations in Group A can be the stations located in area A, and the stations in Group B can be the stations located in area B. The cloud system 400 enables an operator to manage the multiple stations 405 in a centralized, effective fashion. For example, the server 401 can communicate with station 405A3 directly via a network connection (e.g., as indicated by arrow C1). In some embodiments, the stations 405 can function as a data/communication relay device. For example, as shown in FIG. 4, the server 401 can communicate with station 405A2 via station 405A1 (e.g., as indicated by arrows C1 and C2). In some embodiments, the server 401 can communicate with the stations 405 via the cloud server 403 (e.g., as indicated by arrow C3). For example, the server 401 can communicate with station 405A3 via the cloud server 403 (e.g., as indicated by arrows C3 and C4) and communicate with station 405B1 via the cloud server 403 (e.g., as indicated by arrows C3 and C5). In some embodiments, the server 401 can communicate with station 405B2 via both the cloud server 403 and station 405B1 (as indicated by arrows C3, C5, and C6). By this flexible communication arrangement, the server 401 can effectively communicate with each of the stations 405 in a real-time or near real-time manner, thereby eliminating, or at least reducing, inconvenience or delay cause by possible network interruption.

FIG. 5A is a schematic diagram illustrating characteristics of multiple station systems in accordance with embodiments of the disclosed technology. In FIG. 5A, three two-dimensional characteristic curves 501A, 501B and 501C are shown. In other embodiments, however, the characteristic curves can be three-dimensional or multiple-dimensional, depending on the number of factors to be considered when generating such characteristic curves.

The characteristic curves 501A-C represent battery demand predictions (or power consumption predictions) for Stations A-C that are generated (e.g., by a server such as the server system 200) based on information associated with multiple sampling stations (e.g., the collected information mentioned above). In some embodiments, these characteristic curves 501A-C can be compared with actual measurements so as to verify and/or enhance the accuracy of these curves (e.g., compare the characteristic curve 501A with a curve generated by actual measurement performed at Station A). In such embodiments, the results of the comparison can be used to further adjust the characteristic curves 501A-C. In some embodiments, the present technology can use this approach to fine-tune its analysis based on various factors, weightings for the factors, algorithms, etc.

As shown in FIG. 5A, the characteristic curve 501A has a peak portion 503 which can indicate that Station A is a "high-demand-peak-hours" type station. The characteristic curve 501B has a smooth curve which may indicate that Station B has a relative high battery demand in certain time period (e.g., in the mornings) and therefore can be a "commuter" type station. As for Station C, the characteristic curve 501C has a plateau portion 505 in the middle of a day. The plateau portion 505 can indicate that Station C has a relatively high battery demand at noon which can be caused by the traffic to a famous restaurant close to Station C. In some embodiments, the present technology can provide multiple types of characteristic curves or patterns that can be used as reference information to determine battery demand predictions for a battery exchange station.

FIG. 5B is a schematic diagram illustrating characteristics during multiple time frames of a station system in accordance with embodiments of the disclosed technology. In FIG. 5B, three characteristic curves 507A-C for Station X are shown. The characteristic curves 507A-C represent battery demand predictions for Station X in different time frames (e.g., a day, a week, and a year) generated based on information associated with multiple sampling stations.

As shown, the characteristic curve 507A has two peak portions 508 and 509. The peak portions 508 and 509 can indicate commuter traffic close to Station X. The characteristic curve 507B has a plateau portion 511 during the weekdays, which may indicate Station X is close to a road that is intensively used by commuters on weekdays, rather than weekends. The characteristic curve 507C also has two peak portions 513 and 514 in February and July, respectively. These two peak portions 513 and 514 can indicates battery demands caused by events held in a stadium (e.g., in February and July) close to Station X.

In some embodiments, the present technology can provide other types of characteristics or patterns by selecting different factors in different time frames. For example, when using the model associated with Equations A-F discussed above, the characteristics curves 501A-C, 507A-C shown in FIGS. 5A and 5B can be divided into multiple time intervals and then identify battery demands in each time interval for further calculation (e.g., as demand information). By this arrangement, the present technology enables an operator to effectively predict a battery demand for a particular battery exchange station (no matter this station is new or an existing one). The present technology provides flexibility to effectively maintain multiple battery exchange stations. The present technology can enhance energy-efficiency and thus reduce overall expense for charging batteries.

Figure 6:
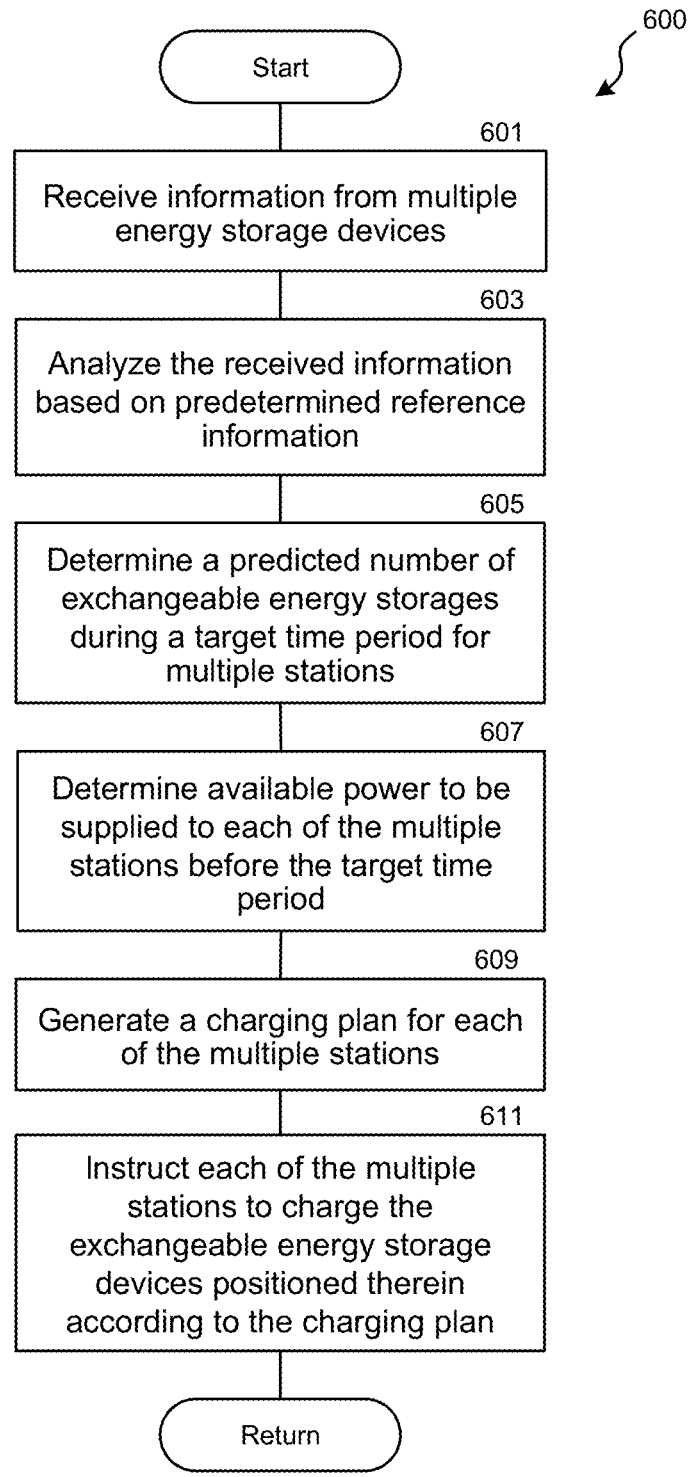
FIG. 6 is a flowchart illustrating a method in accordance with embodiments of the disclosed technology.

FIG. 6 is a flowchart illustrating a method 600 in accordance with embodiments of the disclosed technology. The method 600 is configured to predict a demand of exchangeable batteries for a battery-exchange station. The method 600 can be implemented by a server (e.g., the server system 200). In some embodiments, the method 600 can be implemented by a battery exchange station (e.g., the station system 300). The method 600 starts at block 601 by receiving information from multiple energy storage devices. In some embodiments, these energy storage devices can be located in multiple sampling stations, vehicles, or otherwise held/stored by a user.

At block 603, the method 600 continues by analyzing the received information based on predetermined reference information. The predetermined reference information includes a set of characteristics of multiple categories of stations. At block 605, the method 600 then determines a predicted number of energy storage exchanges during a target time period for multiple stations. As indicated, the server establishes a communication connection to a number of battery-exchange stations and is programmed to predict an expected demand for batteries exchanged at the stations based on information received. The received information can include the previously described information about the location of each station, predicted weather, power supply variations, or availability information retrieved from the battery previously exchanged (charge stations manufacturing date, etc.), information about users who have previously served by the station, information about upcoming reservations, weather forecasts, special events, etc. From the received information, the server is programmed to identify one or more reference factors that can closely predict the actual demand for a selected time period. In one embodiment, the server employs machine learning algorithms to identify weighting values (which can be zero) for one or more reference factors that can closely approximate the actual demand. The identified weighting values and reference factors are then used to predict a battery demand for the new time period and a charging plan, generated based on the battery demand, is sent to each of the stations.

At block 607, the method 600 then determines available power that can be supplied to each of the multiple stations before the target time period. Then at block 609, a charging plan for each of the multiple stations is formed. At block 611, the method 600 includes instructing each of the multiple stations to charge the exchangeable energy storage devices positioned therein according to the charging plan. The method 600 then returns and waits for further instructions.

In some embodiments, the battery demand predictions generated by the disclosed technology can be used to divide the multiple sampling stations (or time intervals of the multiple sampling stations) into different clusters (e.g., by a K-means clustering algorithm). This clustering process is designed to identify a representative station (e.g., a virtual/calculated station) for a group of sampling stations. The clustering process can help simplify/expedite the calculation (e.g., the system need only calculate one type of prediction for one cluster) for demand predictions. In such embodiments, once the clustering process is completed, for future demand predictions, the disclosed system only has to calculate a demand prediction for each cluster.

In some embodiments, the clusters can be characterized by both "station" and a "time interval." For example, Cluster A, B and C represent different levels of demand, e.g., the stations in Cluster A have the lowest demand, the stations in Cluster B have the highest demand, and the stations in Cluster C have a demand level between Cluster A and B. After the clustering process to every time interval of every station, Cluster A can represent the battery demand for Station X during 1 a.m. to 4 a.m., Cluster B can represent the battery demand for Station Y during 5 p.m. to 6 p.m., and Cluster C can represent the battery demand for Station Z during 2 a.m. to 4 a.m. In some embodiments, the clusters can be characterized as multiple time periods during a week. For example, Cluster A not only represents Station X during 1 a.m. to 4 a.m., but also represents Station Y during 4 a.m. to 6 a.m. and Station Z during 12 a.m. to 3 a.m. (i.e., these time intervals of station X, Y and Z have similar levels of demand, so these time intervals of stations are being assigned in Cluster A during the clustering process). In some embodiments, the clustering process could be done under certain conditions (e.g., control factors). For example, there can be six clusters during the weekdays of a week (e.g., Clusters WD1-6), and there can be three clusters during the weekend (e.g., Clusters WE1-3).

In some embodiments, the clusters can be further divided based on environmental conditions such as "sunny" or "rainy." For example, there can be three clusters for the "sunny" condition (Clusters S1-3), and there can be three clusters for the "rainy" condition (Clusters R1-3). In some embodiments, the clusters can be determined based on two or more factors. For example, the clusters can be characterized by both the "weekday/weekend" factor and the "sunny/rainy" factor. Using the example above, after considering these two factors, there can be 27 clusters (e.g., multiply 9 by 3). The disclosed system can further consider other factors such as locations, user types, etc. to get more clusters.

In some embodiments, some clusters can be identified or labeled as being closely related to certain station characteristics (e.g., the location of a station). In some embodiments, the stations could be identified or labeled based on certain characteristics. For example, the system can select "weekday/weekend" as a control factor, and then identify if "Station X from 9 a.m. to 12 p.m." has any demand characteristics similar to those in clusters WD3, WD2, WD4 and WD5. For example, some clusters can be identified as "city type" "country type" "attraction type," "downtown type," etc. However, some clusters may be related to multiple factors and therefore cannot be readily identified as being related to a specific factor. In some embodiments, the characteristics mentioned herein are determined based on system preferences or statistical/machine training results from historical data.

In some embodiments, the clustering process can be done based on various factors from the same data. The identifying/labeling process (e.g., to identify certain characteristics) can be done by considering all the clustering results (with or without weightings corresponding to the factors considered). For example, a "city type" cluster may have (1) a distribution of demand $D_1$ in a "weekday" category and (2) a distribution of demand $D_2$ in a "Sunny" category. As another example, a "country type" cluster may have a distribution of demand $D_3$ in a "weekday" category but a $D_2$ distribution in a "Rainy" category.

When the clustering process is completed, the system can then assign battery demand predictions to various time periods of a battery stations based on corresponding clusters. For example, a time period of 1 a.m. to 4 a.m. Wednesday in Station X is determined as belonging to Cluster WD2. Based on a battery demand prediction for Cluster WD2, there are 20 battery exchanges during this period. The system can accordingly determine that there will be 20 expected battery exchanges at Station X during 1 a.m. to 4 a.m. every Wednesday. In the illustrated embodiments, the minimum analysis time interval is "hour." In other embodiments, the minimum analysis time interval can be other time periods.

In some embodiments, when the disclosed system generates a demand prediction (e.g., for each cluster), the disclosed system can further simplify the demand prediction process by selecting one or more factors and then using the selected factors to generate demand predictions (e.g., to "supervise" the prediction result) with less computing time and resources.

For example, a system operator can select three factors to simplify the demand prediction process. These three factors are (1) weather (e.g., users may be reluctant to go to a battery exchange station in cold weather conditions); (2) national or local holidays (e.g., for "commuter" type users, they may exchange fewer batteries on holidays than normal working days); and (3) special events (e.g., a concert held close to a battery station, a battery exchange campaign held by a battery exchange service provider, an accident, etc.).

Considering these three factors, the disclosed system can then generate a predicted battery demand curve or pattern for each cluster. In some embodiments, the disclosed system can further adjust the predicted demand curve or pattern for battery stations in one cluster based on the locations of the battery stations. Based on the three selected factors, the disclosed system determines whether a certain type of battery station would be affected by these selected factors. For example, for the "city-commuter" type station (e.g., those with high demands during peak commuting hours), the disclosed system can determine that (1) the weather factor may not strongly affect the battery demands at least because commuters need to go to work even in cold weather conditions; (2) the holiday factor strongly affects the battery demands at least because commuters do not go to work during holidays; and (3) the event factor may not strongly affect the battery demands at least because commuters do go to work despite an event held close to such type of stations. Accordingly, the disclosed system can generate the demand predictions for the "city-commuter" type of stations based primarily on the holiday factor. Once a new station is added to the system and is determined as a "city-commuter" type station, the system can conveniently generate a demand prediction based on existing demand predictions with minor adjustments (e.g., adjustments based on its location).

The disclosed system can later analyze whether the generated demand prediction is suitable for the new station (e.g., by comparing the demand prediction with actual demand in the past week, month, or days). The disclosed system can further adjust the demand prediction based on the comparison.

In the embodiments discussed herein, a "component" can include a processor, control logic, a digital signal processor, a computing unit, and/or any other suitable device that is either configured or is programmed to execute instructions to perform the functionality described above.

Figure 7:
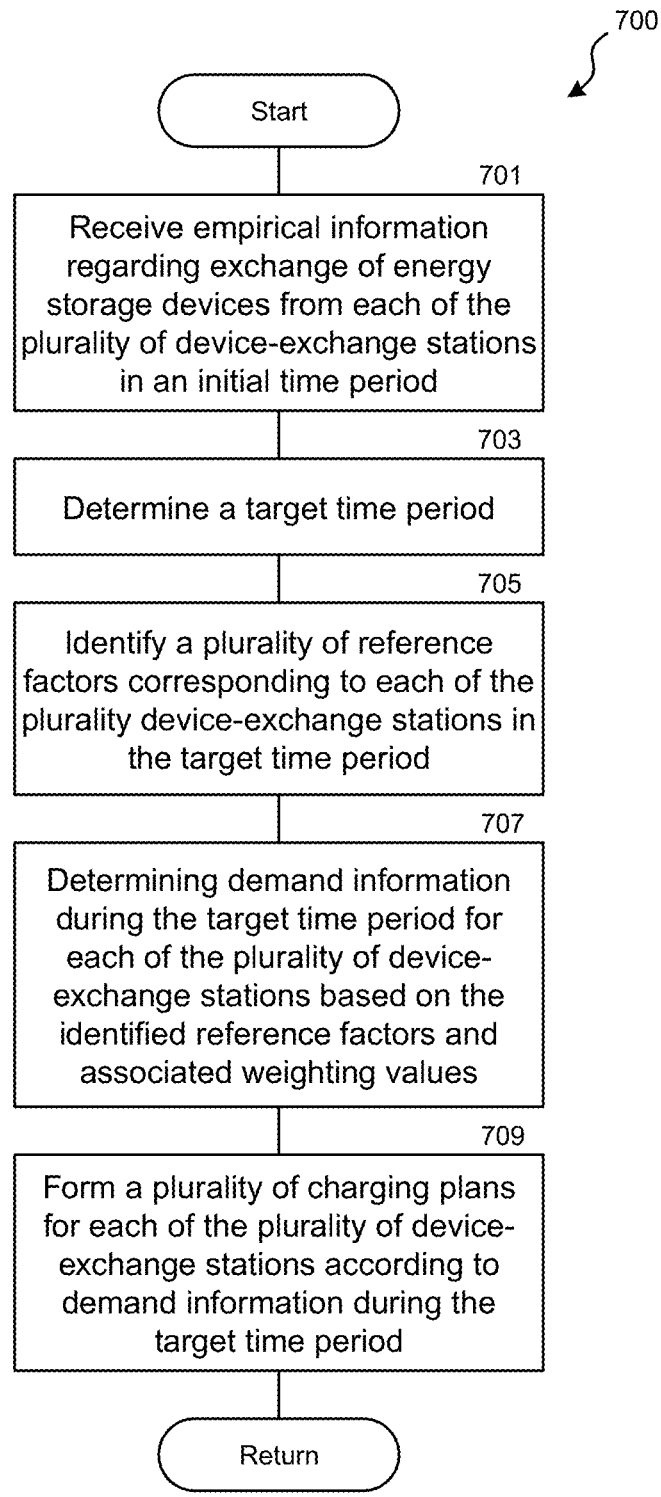
FIG. 7 is a flowchart illustrating a method in accordance with embodiments of the disclosed technology.

FIG. 7 is a flowchart illustrating a method 700 in accordance with embodiments of the disclosed technology. The method 700 is configured to manage a plurality of device-exchange stations (e.g., the station system 300). The method 700 can be implemented by a server (e.g., the server system 200). The method 700 starts at block 701 by receiving empirical information regarding exchanges of energy storage devices from each of the plurality of device-exchange stations in an initial time period. In some embodiments, the received information can include information regarding an actual supply of energy storage devices for each of the plurality of device-exchange stations in the initial time period.

At block 703, the method 700 then determines a target time period (e.g., for predicting a battery exchange during this target time period, in some embodiments, provided by a system operator). At block 705, the method 700 continues by identifying a plurality of reference factors corresponding to each of the plurality device-exchange stations in the target time period. For example, the system operator can select which factors he/she wants to include in the factor matrix (see, e.g., Equation A above). The predetermined reference factors can include (1) multiple characteristics associated with the plurality of device-exchange stations, (2) combinations of the characteristics (e.g., the "crossing-term" factor mentioned above), (3) "type" of stations (e.g., (e.g., "curves" described in FIGS. 5A and 5B), and (4) combination of the above.

At block 707, the method 700 then determines demand information during the target time period for each of the plurality of device-exchange stations based on the identified reference factors corresponding to each of the device-exchange stations and weighting values associated with the identified reference factors. The weighting values are included in the empirical information. The demand information is indicative of a predicted number of exchangeable energy storage devices (that will be exchanged) during the target time period for each of the device-exchange stations. The target time period is later than the initial time period.

In some embodiments, the system operator can also determine corresponding initial weighting values (e.g., a default value balanced all reference factors, based on empirical studies or experiences, etc.) and then update the same afterwards (e.g., based on a comparison of actual battery exchanges and a predicted result calculated based on the initial weighting values). In the embodiments described above with reference to FIG. 1 and Equations A-F, the initial weighting values can also be determined adjusted in this fashion. In some embodiments, the weighting values are determined based on an objective function that minimizes a difference between an actual exchange number (or a battery supply) and a demand of energy storage devices (e.g., an unsatisfied demand) from each of the plurality of device-exchange stations in the initial time period. In some embodiments, the plurality of reference factors can include a type of device-exchange stations.

In some embodiments, the weighting values are determined based on analyzing relationships between the reference factors. In some embodiments, the empirical information includes information regarding an actual number of energy storage devices exchanged for each of the plurality of device-exchange stations in the initial time period. In some embodiments, the weighting values are determined based on an objective function (e.g., Equation B above) that minimizes a difference between the actual exchange number and a predicted demand of energy storage devices for each of the plurality of device-exchange stations in the initial time period. In the embodiments described above with reference to FIG. 1 and Equations A-F, the initial weighting values can also be determined adjusted in this fashion.

At block 709, the method 700 continues to form a plurality of charging plans for each of the plurality of device-exchange stations according to demand information during the target time period. In some embodiments, each of the charging plans can include a plurality of charging rules corresponding to the energy storage devices located at each of the plurality of device-exchange stations. In some embodiments, the method 700 can include analyzing relationships between the received information and the plurality of predetermined reference factors based on a machine learning training process.

In some embodiments, the method 700 can include steps of (1) calculating a predicted number of energy storage devices to be exchanged for the first device-exchange station during the target time period; (2) receiving an actual exchange number of energy storage devices that were exchanged at the first device-exchange station in the target time period; (3) analyzing the actual exchange number and the predicted number of energy storage devices of the first device-exchange station in the target time period, so as to determine a failure contributing rate for each of the reference factors associated with the first device-exchange station in the target time period; and (4) updating the weighting value based on the failure contributing rate. Embodiments regarding the failure contributing rate are discussed above with reference to Equations C and D. In some embodiments, the method 700 includes determining a maximum number of characteristic to be used when analyzing the received information.

In some embodiments, the target time period can be an hour of a day. In some embodiments, the target time period can be twenty-four hours of a day. In some embodiments, the demand information is determined on an hourly basis. In some embodiments, the multiple characteristics comprise an hour of a day, the day of a week, the day of a month, the day of a year, locations of the plurality of device-exchange stations, an environmental condition, or a triggering event. In some embodiments, the method 700 can include determining, based on the analytical result, one or more types of the plurality of device-exchange stations.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method for managing a plurality of device-exchange stations, the method comprising:
receiving empirical information regarding exchanges of energy storage devices from each of the plurality of device-exchange stations in an initial time period;
determining a target time period;
identifying a plurality of reference factors corresponding to each of the plurality device-exchange stations in the target time period, wherein the reference factors comprise multiple characteristics and combinations of the characteristics;
determining demand information during the target time period for each of the plurality of device-exchange stations based on the identified reference factors corresponding to each of the device-exchange stations and weighting values associated with the identified reference factors, the weighting values being comprised in the empirical information, wherein the target time period is later than the initial time period;
forming a plurality of charging plans for each of the plurality of device-exchange stations according to demand information during the target time period; and
instructing the plurality of device-exchange stations to charge the energy storage devices according to the charging plans.

2. The method of claim 1, wherein:
the plurality of reference factors comprises a type of device-exchange stations.

3. The method of claim 1, wherein the weighting values are determined based on analyzing relationships between the reference factors.

4. The method of claim 1, wherein:
the empirical information comprises information regarding demand information and an actual exchange number of energy storage devices for each of the plurality of device-exchange stations in the initial time period; and
the weighting values are determined based on an objective function that minimizes a difference between the actual exchange number and a demand of energy storage devices from each of the plurality of device-exchange stations in the initial time period.

5. The method of claim 1, further comprising:
calculating a predicted exchange number of exchangeable energy storage devices for a first device-exchange station during the target time period.

6. The method of claim 5, further comprising:
receiving an actual exchange number of energy storage devices of the first device-exchange station in the target time period;
analyzing the actual exchange number and the predicted exchange number of energy storage devices of the first device-exchange station in the target time period; and
updating the weighting values corresponding to each of the identified reference factors according to the analyzed result.

7. The method of claim 6, further comprising:
updating the weighting values based on a plurality of failure contributing rates corresponding to each of the identified reference factors.

8. The method of claim 1, wherein the target time period is an hour of a day.

9. The method of claim 1, wherein the target time period is twenty-four hours of a day, and wherein the demand information is determined on an hourly basis.

10. The method of claim 1, wherein the multiple characteristics comprise an hour of a day, the day of a week, the day of a month, the day of a year, locations of the plurality of device-exchange stations, an environmental condition, or a triggering event.

11. The method of claim 1, wherein the demand information is determined based on an online Poisson regression or an online least square regression.

12. The method of claim 1, further comprising:
determining a maximum number of reference factors to be used when analyzing the received information.

13. The method of claim 1, wherein each of the charging plans comprises a plurality of charging rules corresponding to the energy storage devices located at each of the plurality of device-exchange stations.

14. A server system for managing a plurality of device-exchange stations, the server system comprising:
a processor configured to:
receive empirical information regarding exchanges of energy storage devices from each of the plurality of device-exchange stations in an initial time period;
determine a target time period;
identify a plurality of reference factors corresponding to each of the plurality device-exchange stations in the target time period, wherein the reference factors comprise multiple characteristics and combinations of the characteristics;
determine demand information during the target time period for each of the plurality of device-exchange stations based on the identified reference factors corresponding to each of the device-exchange stations and weighting values associated with the identified reference factors, the weighting values being comprised in the empirical information, wherein the demand information is indicative of a predicted exchange number of exchangeable energy storage devices during the target time period for each of the device-exchange stations, and wherein the target time period is later than the initial time period;

form a plurality of charging plans for each of the plurality of device-exchange stations according to demand information during the target time period; and instruct the plurality of device-exchange stations to charge the energy storage devices according to the charging plans; and, a communication component configured to transmit the plurality of charging plans to each of the plurality of device-exchange stations.

15. The system of claim 14, wherein:
the plurality of reference factors comprises a type of device-exchange stations; and
the weighting values are determined based on analyzing relationships between the reference factors.

16. The system of claim 14, wherein:
the empirical information comprises information regarding demand information and an actual exchange number of energy storage devices for each of the plurality of device-exchange stations in the initial time period; and
the weighting values are determined based on an objective function that minimizes a difference between the actual exchange number and a demand of energy storage devices from each of the plurality of device-exchange stations in the initial time period.

17. The system of claim 14, wherein the processor is configured to:
calculate a predicted exchange number of exchangeable energy storage devices for a first device-exchange station during the target time period;
receiving an actual exchange number of energy storage devices of the first device-exchange station in the target time period;
analyzing the actual exchange number and the predicted number of energy storage devices of the first device-exchange station in the target time period; and
updating the weighting value corresponding to each of the identified reference factors according to the analyzed result.

18. The system of claim 14, wherein the target time period is an hour of a day.

19. The system of claim 14, wherein the target time period is twenty-four hours of a day, and wherein the demand information is determined on an hourly basis.

20. The system of claim 14, wherein the multiple characteristics comprise an hour of a day, the day of a week, the day of a month, the day of a year, locations of the plurality of device-exchange stations, an environmental condition, or a triggering event.

* * * * *